United States Patent
Brown et al.

(10) Patent No.: US 7,126,935 B1
(45) Date of Patent: *Oct. 24, 2006

(54) WIRELESS SERIAL PORT TRANSCEIVER

(75) Inventors: John P. Brown, Franklin, OH (US);
Terry L. Tincher, Lebanon, OH (US);
Donald A. Morrison, Bellbrook, OH (US)

(73) Assignee: Paxar Americas, Inc., Miamisburg, OH (US)

( * ) Notice: Subject to any disclaimer, the term of this patent is extended or adjusted under 35 U.S.C. 154(b) by 377 days.

This patent is subject to a terminal disclaimer.

(21) Appl. No.: 09/710,351

(22) Filed: Nov. 9, 2000

Related U.S. Application Data

(63) Continuation of application No. 08/948,271, filed on Oct. 9, 1997, now Pat. No. 6,163,538.

(51) Int. Cl.
*H04J 3/24* (2006.01)

(52) U.S. Cl. ............................. 370/349; 709/208

(58) Field of Classification Search ............... 370/389, 370/349, 475, 310, 313, 324, 401; 709/203, 709/202, 208, 209, 211, 230, 237; 710/1
See application file for complete search history.

(56) References Cited

U.S. PATENT DOCUMENTS

| | | | |
|---|---|---|---|
| 4,665,519 A | 5/1987 | Kirchner et al. | 370/375 |
| 4,866,602 A | 9/1989 | Hall | 364/200 |
| 5,107,100 A | 4/1992 | Shepard et al. | 235/472 |
| 5,218,188 A | 6/1993 | Hanson | 235/375 |
| 5,307,297 A | 4/1994 | Iguchi et al. | 364/345 |
| 5,371,348 A | 12/1994 | Kumar et al. | 235/472 |
| 5,488,631 A | 1/1996 | Gold et al. | 375/206 |
| 5,602,854 A | 2/1997 | Luse et al. | 370/455 |
| 5,630,081 A | 5/1997 | Rybicki et al. | 395/348 |
| 5,668,803 A | 9/1997 | Tymes et al. | 370/312 |
| 5,678,191 A | 10/1997 | Eaton et al. | 455/38.1 |
| 5,771,352 A | 6/1998 | Nakamura et al. | 395/200.57 |

(Continued)

FOREIGN PATENT DOCUMENTS

WO    WO 92/02084    2/1992

OTHER PUBLICATIONS

Johnson, et al.; U.S. Appl. No. 08/502,612, filed Jul. 14, 1995; Mobile Multi-Printer Station Printing Barcode Labels and Signs.

(Continued)

*Primary Examiner*—Brenda Pham
(74) *Attorney, Agent, or Firm*—Joesph J. Grass

(57) ABSTRACT

A pair of compact, energy-efficient, intelligent, wireless transceiver units are designed to replace the cable that interconnects a portable bar-code scanner, keyboard, and display or other host to a portable bar-code printer or the like. When reset, the units exchange linkage packets and thereby exchange addresses. Thereafter, the two units communicate in an error-free fashion with each other, even in the presence of noise and interference, by exchanging addressed packets containing error detection information. Alternate transmission frequencies are selected when transmissions cannot be received at one frequency. The host unit may maintain independent linkages with multiple printers or the like, with a switch on the host unit selecting the desired printer. Power usage is minimized by shutting down transmitters, receivers, serial port drivers, and microprocessors whenever possible, and for extended periods when data is not being transmitted.

57 Claims, 24 Drawing Sheets

U.S. PATENT DOCUMENTS

| | | | |
|---|---|---|---|
| 5,771,453 A | 6/1998 | Haartsen | 455/449 |
| 5,797,089 A | 8/1998 | Nguyen | 455/403 |
| 5,799,012 A | 8/1998 | Ayerst et al. | 370/336 |
| 5,812,930 A | 9/1998 | Zavrel | 455/5.1 |
| 5,864,708 A | 1/1999 | Croft et al. | 710/1 |
| 5,896,375 A | 4/1999 | Dent et al. | 370/347 |
| 5,905,248 A | 5/1999 | Russell et al. | 235/472 |
| 5,905,251 A | 5/1999 | Knowles | 235/472 |
| 5,940,771 A | 8/1999 | Gollnick et al. | 455/517 |
| 6,163,538 A * | 12/2000 | Brown et al. | 370/389 |
| 6,246,696 B1 | 6/2001 | Yamaguchi et al. | 370/475 |

OTHER PUBLICATIONS

Williams et al., Infrared Data Association Serial Infrared Link Access Protocol (IrLAP), Jun. 16, 1996, pp. 1-115.

Ayers, Robert G. "Selection of Forward Error Correcting Code for the Data Communication Radio Link of the Advanced Train Control System" IEEE Transactions on Vehicular Technology (38) Nov. 1989, pp. 247-254.

Hopping and Hacklander, "Long-Distance IrDA link; infrared data link covers up to 20 m" Elektor Electronics May 1997; pp. 26-31.

* cited by examiner

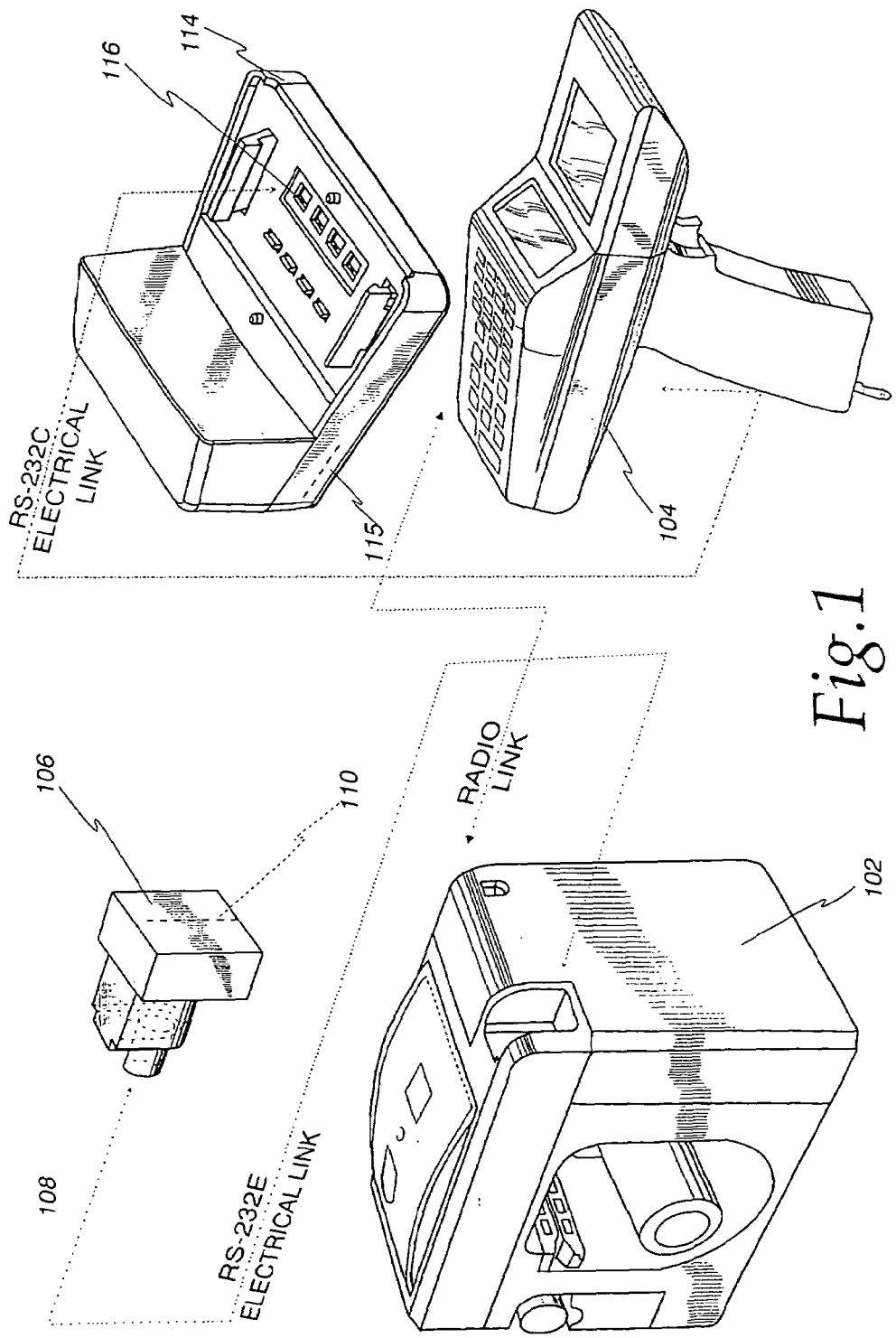

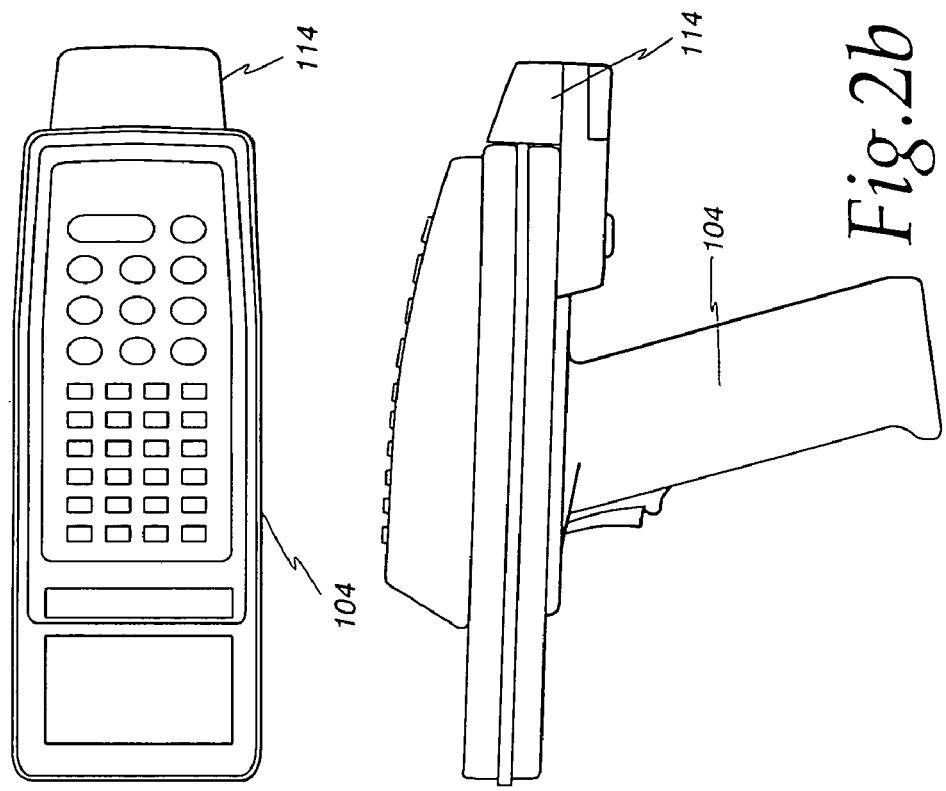
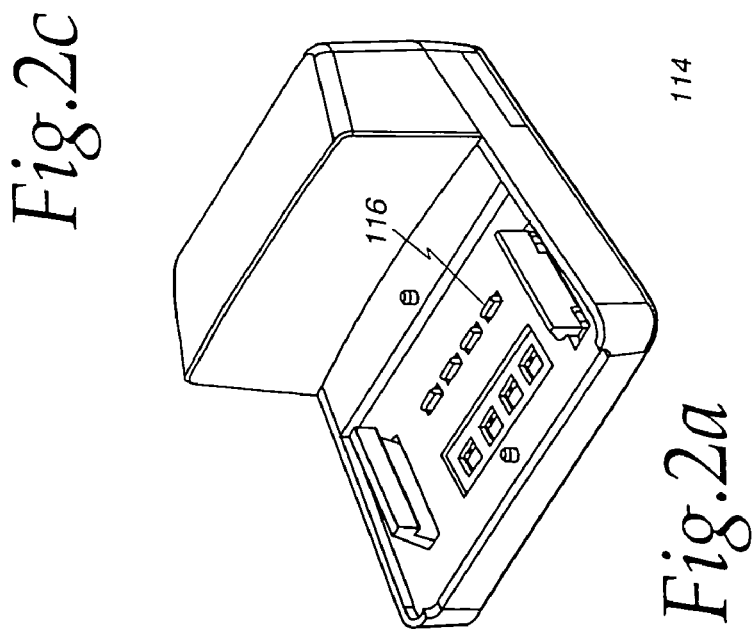

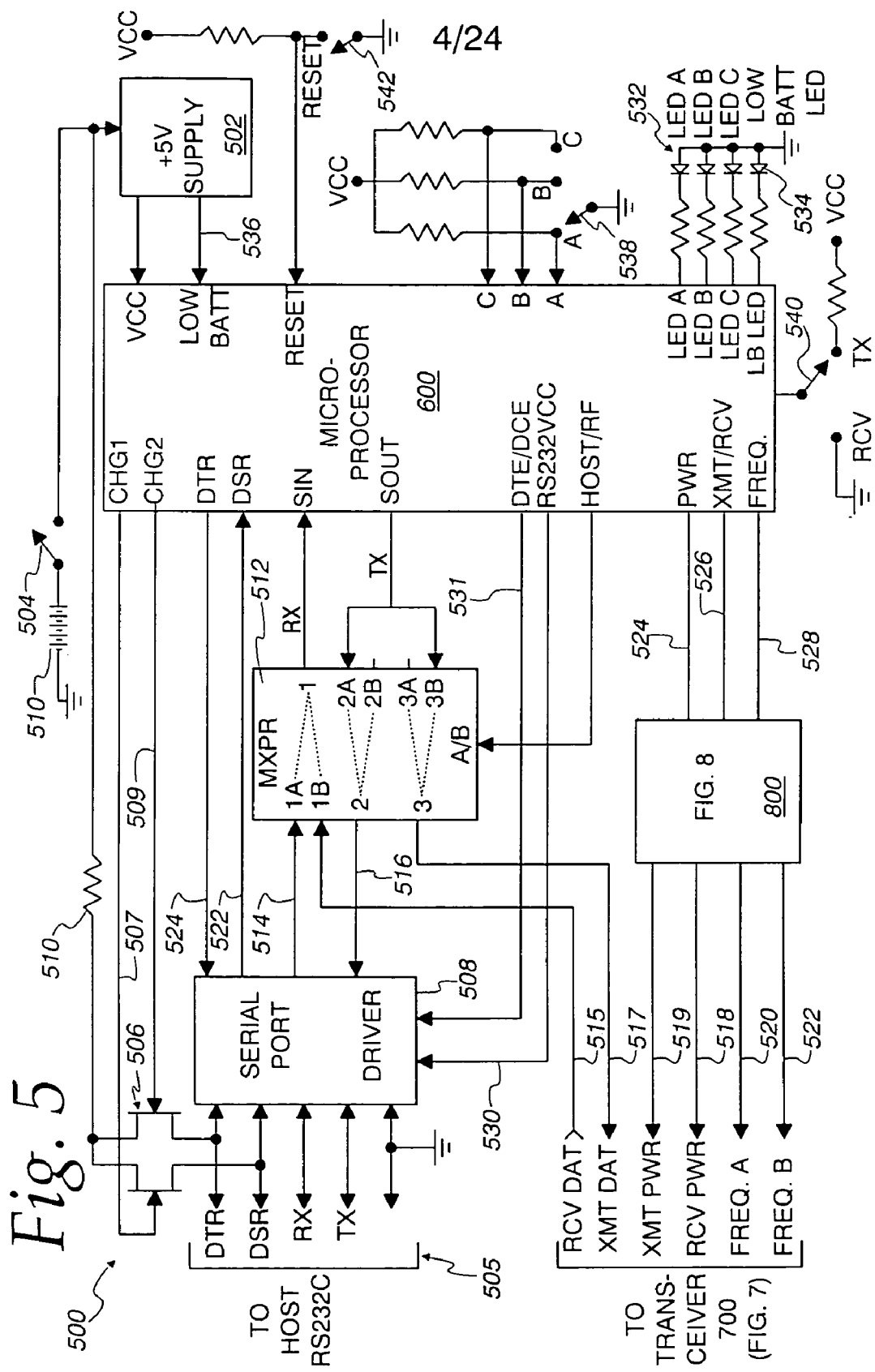

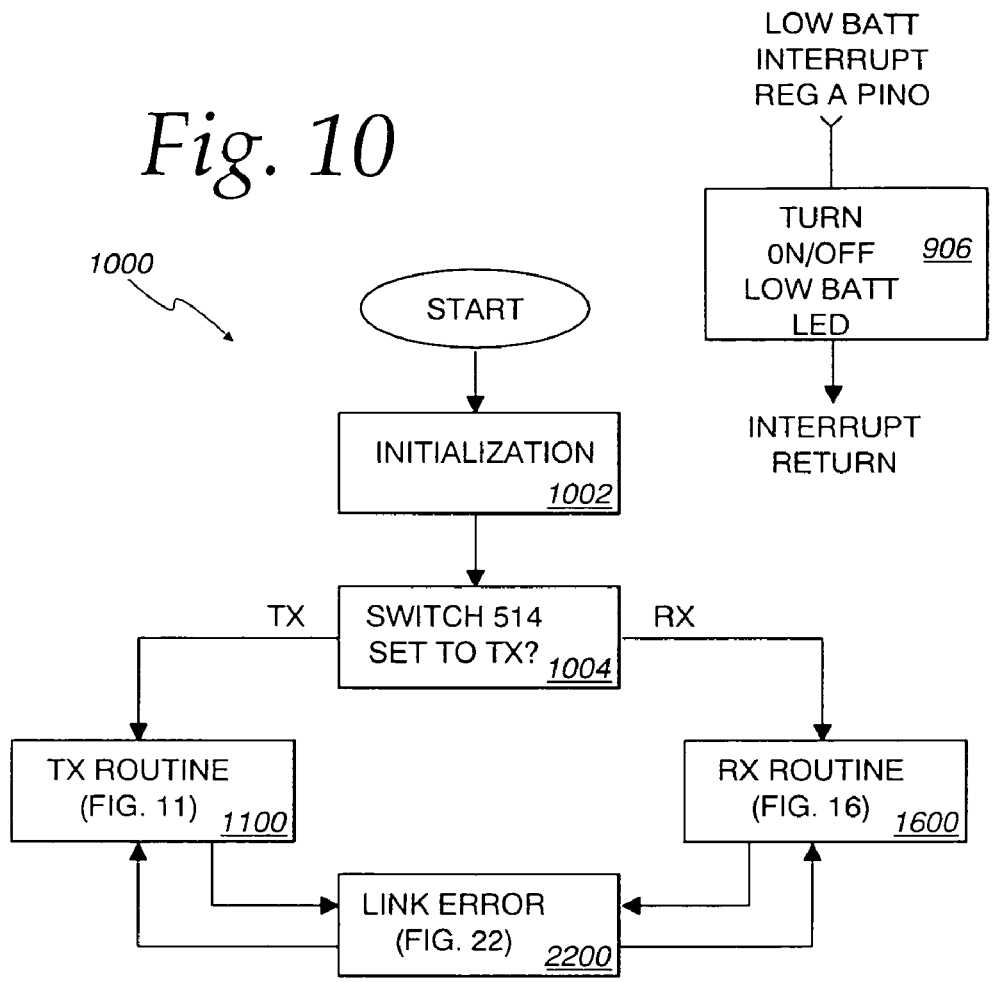
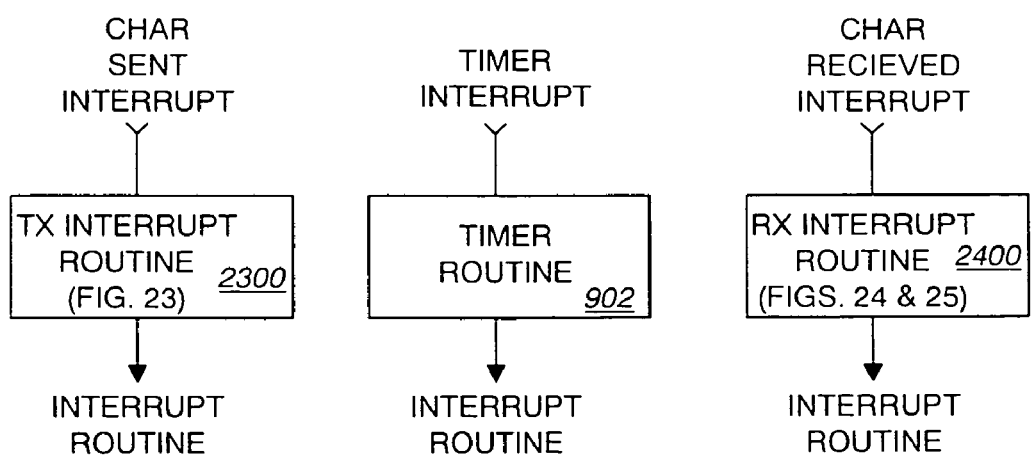
Fig. 10

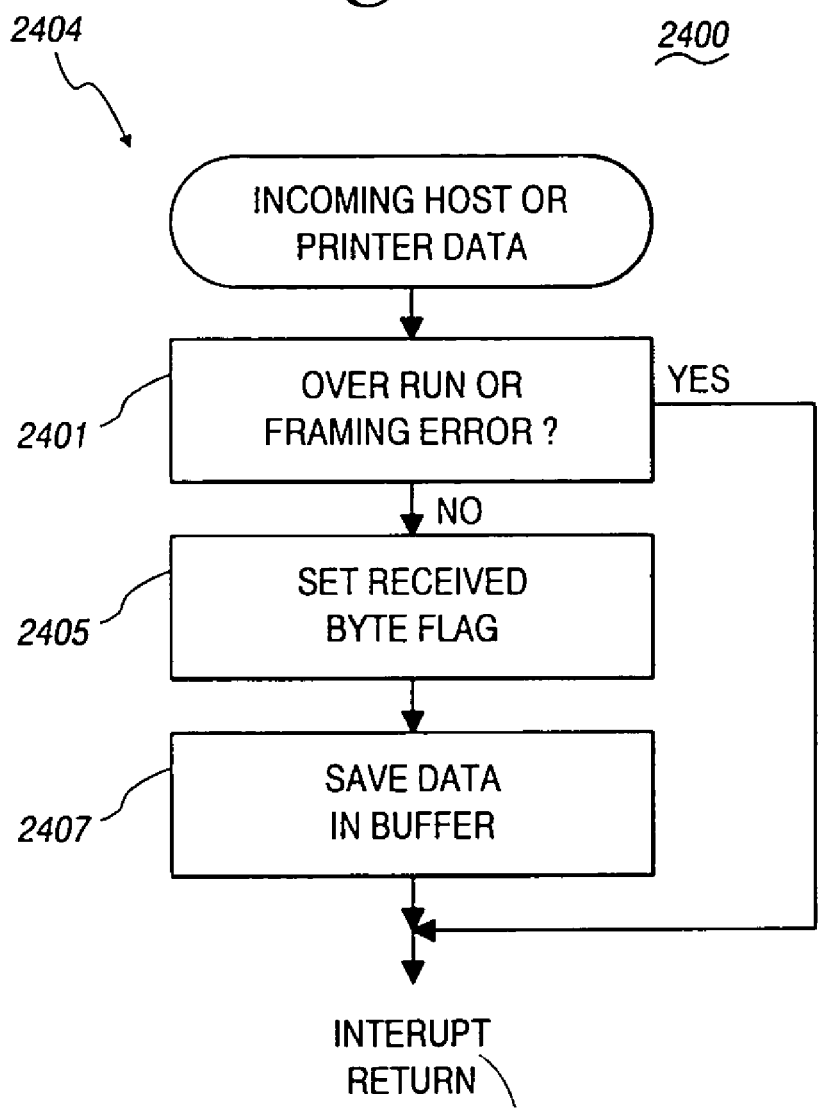

WIRELESS SERIAL PORT TRANSCEIVER

RELATED U.S. APPLICATION DATA

This application is a Continuation of U.S. patent application Ser. No. 08/948,271, filed Oct. 9, 1997 now U.S. Pat. No. 6,163,538.

FIELD OF THE INVENTION

This invention relates to communications between data entry and storage systems and printers and the like, and more particularly to communications systems for interconnecting portable printers suitable for printing labels and bar codes with portable bar code scanners, data entry terminals, and servers containing data such as product codes and pricing information. The invention also has applicability to any situation where it is desired to establish a two-way, wireless data link between two devices which normally communicate over some industry-standard form of cable.

BACKGROUND OF THE INVENT ION

Description of the Related Art

Printers and the like are traditionally connected to personal computers by means of serial data cables. Serial signal protocols, connectors, and cables typically conform with the RS-232-C standard of the Electronic Industries Association (EIA), a standard for the interface between Data Terminal Equipment or DTE (terminals and personal computers and printers) and Data Communications Equipment or DCE (typically modems) employing serial binary interchange (see also the comparable CCITT standard V.24). Traditionally, a 25-pin standardized connector was used, but newer designs utilize connectors having fewer pins which are also standardized. This high level of standardization makes it relatively simple to interconnect any computer to any modem or any printer.

The RS-232-C standard provides for two-way serial communications over two wires, with data flowing out (from the DTE) over a first wire and back (from the DCE) over a second wire. When a "Data Terminal Equipment" (DTE) connects to a "Data Communications Equipment" (DCE), as when a personal computer connects to an external modem, the pin numbers at each end of the standard RS-232-C cable match up properly so that pin 1 on the computer connects to pin 1 on the modem, pin 2 connects to pin 2, pin 3 connects to pin 3, and so on. But when a DTE connects to a DTE, as when a DTE personal computer connects to a DTE printer, the RS-232-C cable must be rewired so that pins 2 and 3 at one end connect respectively to pins 3 and 2 at the other end; and other wires may also have to be cross-connected to insure a proper hardware handshake, in accordance with the standard and the specialized needs of the equipment at either end of the cable. Such a cable is called a "null modem," since it can be thought of as the equivalent of two DCE modems connected by a telephone line and interconnecting the two DTE's.

In the field of label printing, it is often desirable to provide portable bar coded label scanning equipment, keyboards for entering commands, servers for storing pricing and label image data, and printing equipment that can be carried about and used where needed to print new and replacement labels. Typically, this equipment is directly connected together by means of serial cables, connectors, and protocols of the type just described. Such cables can get in the way of hand-held scanning equipment and can become disconnected. Cables are also subject to wear and tear and are expensive to replace. Serial cables cannot be unduly long, so they sometimes require the keyboard and scanning equipment to be located closer to the printing equipment than is often desirable. To switch between multiple printers, cables may have to be disconnected and reconnected, or cumbersome switch boxes must be used, or multiple jacks and cables must be provided, or a local area network or LAN must be set up and managed.

Radio links can be utilized as a replacement for such cables, but such links can be unreliable, since errors can result from static and interference and the like. Some such radio links appear to the computer and printer to be modems, but such links cannot be used without redesign of the related computer and printer equipment, since modems must be sent special codes that initialize the modems, set transmission speeds, and select protocols. Redesign is required to provide these special codes.

Wireless LANs are known which utilize spread spectrum technology to transmit messages among a series of radio links, but such LANS again cannot be used as direct replacements for serial cables without redesigning the related equipment to implement a local area network. Such systems typically utilize complex spread-spectrum technology and are quite expensive. See, for example, U.S. Pat. No. 5,107,100 which issued on Apr. 21, 1992 to Shepard, et al. (See col. 7, line 35 to col. 8, line 13). Spread spectrum technology is explained in U.S. Pat. No. 5,029,183 which issued on Jul. 2, 1991 to LaRoy Tymes.

U.S. patent application Ser. No. 08/502,612, filed on Jul. 14, 1995 by Kelly L. Johnson and Mark W. Roth (and assigned to the same assignee as the present application), teaches use of a single radio link driving a remotely-controllable multiplexer (44 in FIG. 2) to connect any one of multiple printers back to a host computer source of data. Special addressed data packets, sent over the radio link by the host computer, cause the remote multiplexer to switch the radio link to any desired one of several remote printers whose data input cables are plugged into the multiplexer. Once properly switched, the radio link and multiplexer together provide a direct path from the host computer to a particular one of several printers. But the host computer must be specially programmed to know the printer addresses and to send out the special addressed data packets to the multiplexer, and the printers must be plugged directly into the multiplexer. This application teaches the use of data packets similar to those used in the present invention, but their use is not transparent to the host computer which must be especially programmed to generate such packets and to know the addresses of the printers.

Accordingly, existing equipment presently in the field and designed to support conventional serial communication over conventional RS-232-C cables cannot be simply retrofitted to function in the manner just described without radical redesign. Only customized printers and the like can be supported by such systems.

SUMMARY OF THE INVENTION

Objects of the Invention

Accordingly, it is a general object of the present invention to provide a wireless interconnection between a source of information, such as a personal computer linked to a central data repository or a portable bar code scanner and keyboard assembly, and a sink for information, such as one or several portable printers for printing tags and labels.

A further object of the invention is to provide such an interconnection which can be used as a direct replacement for a standard serial cable interconnection without the need for extensive modification of the interconnected equipment.

Another object of the invention is the achievement of such an interconnection which is highly immune from noise and interference.

A further object is the provision of a simple method for linking a data source to any one of several printers without advanced knowledge of printer numeric addresses and without redesign of the equipment.

Yet another object is the provision of such a wireless interconnection between battery-powered units with due regard to maximizing power conservation.

Features of the Invention

In accordance with these and other objects, the present invention, briefly described, comprises a pair of compact, energy-efficient, intelligent radio transceiver units designed to directly connect to industry-standard serial (or parallel) ports as a direct replacement for cabled interconnections. A first unit, designated the XMT unit by means of a switch, is plugged into a source of information, such as a portable scanner with on-board keyboard and display. One or more second, electrically identical units, designated RCV units by their corresponding switches, are plugged into the destinations for the information, such as one or more portable printers for printing bar codes and other indicia on labels and the like.

The XMT unit, when first turned on or reset, begins broadcasting link information packets identifying itself (by address) and seeking a nearby receiver. Each RCV unit, when first turned on or reset, begins listening for just such a link information packet. Upon receipt of such a packet, the receiver error checks the packet, and then sends back a link response packet containing the RCV unit's address. Once such link packets have been successfully sent and received, the two units are linked and thereafter communicate only with each other and not with other information sources and destinations that may be present, possibly sharing the same transmission frequencies.

Information is thereafter sent back and forth in packets containing error-detection information. Erroneous packets are re-transmitted. If interference causes multiple successive packets to be missed, both the transmitter and receiver switch simultaneously to an alternate frequency and attempt to communicate once more.

A multi-position switch on the XMT unit can be thrown to a second or third position, enabling the XMT unit to link to second and third RCV units. In this manner, a single XMT unit can be linked to two, three, or more separate printers, with the user using the multi-position switch to select which printer to use at any given moment.

To conserve energy, both units power themselves down whenever possible. During idle periods, the RCV unit powers down its receiver and only powers it up occasionally at times when data is actually likely to be transmitted. The XMT unit, knowing in advance when the RCV unit's receiver is powered on, knows just when to power up its transmitter to send information.

Power can come from a battery, or from the serial port connections, or both.

BRIEF DESCRIPTION OF THE DRAWINGS

Further objects and advantages of the invention are apparent in the detailed description which follows and in the drawings wherein:

FIG. 1 is a perspective view of two serial communications radio units 106 and 114 designed in accordance with the present invention used to interconnect a hand-held bar-code scanning device 104 having a keyboard and a display and a portable, compact printer 102 for printing labels and the like;

FIGS. 2A, 2B, and 2C present elevational, plan, and perspective views of the serial communication radio unit 114 designed for attachment to a hand-held bar-code scanning device 104 (shown in FIGS. 2B and 2C);

FIG. 5 is an overview electrical block diagram of a serial communications unit 500, illustrating its major electrical components and how they interconnect (the transceiver 700 portion of the unit 500 appears in FIG. 7);

FIG. 10 is a block diagram of the main program 1000 and the interrupt driven routines of the serial communications radio unit 500 (FIG. 5);

FIG. 16 presents a block diagram of the RX routine 1600 which controls the operations of a serial communications unit 500 configured for use as a remote slave unit connected to a printer or the like;

FIGS. 24 and 25 together form a block diagram of an RX INTERRUPT routine 2400 which receives data coming into a serial communications radio unit 500 from either a radio link in packetized form (2402 in FIG. 24) or as a serial data stream from an RS-232-C serial port (2404 in FIG. 25).

DETAILED DESCRIPTION OF THE PREFERRED EMBODIMENT

Figure 4:
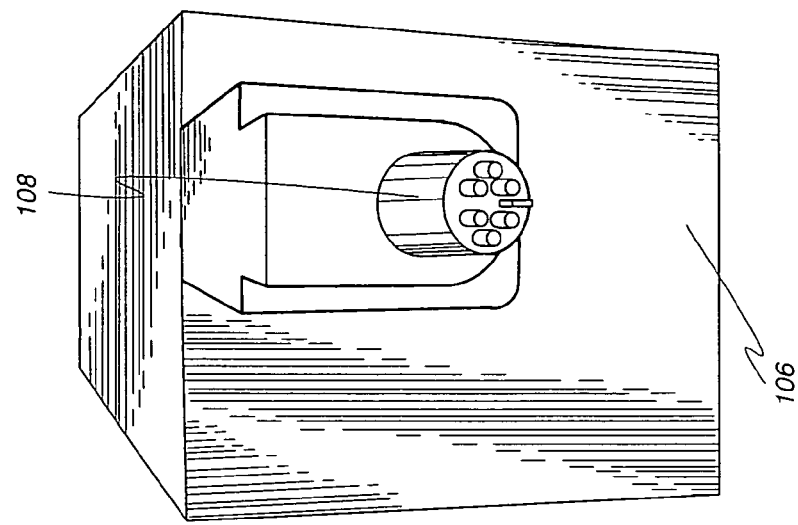
FIG. 4 is a perspective view of a serial communications radio unit 106 designed for attachment to the serial port connector 112 shown in FIG. 3 of the portable printer 102 shown in FIGS. 1 and 3.
Figure 3:
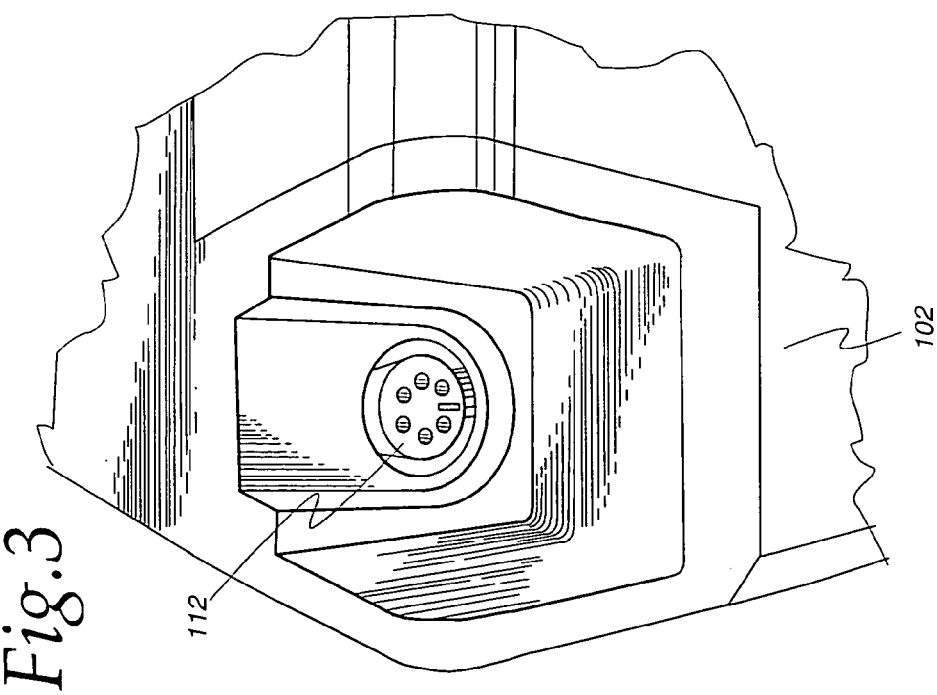
FIG. 3 is a perspective view of a serial port connector 112 that is part of the portable printer 102 shown in FIG. 1.

With reference to FIG. 1, an embodiment of the present invention is shown used to interconnect a portable printer 102 to a hand-held bar code scanner, keyboard, and printer assembly 104. A first unit 106 having a serial port connector 108 (FIGS. 1 and 4) and hidden antenna 110 (embedded in the case of the unit 106) is designed and shaped so that its connector 108 engages a serial port connector 112 on the printer 102 (FIG. 3) in such a manner that the unit 106 engages the printer 102 snugly and securely. Likewise, a second unit 114 has an antenna 115 (embedded in the case of the unit 114) and a serial port connector 116 that engages a complementary serial port connector (not shown) on the scanner, keyboard, and printer assembly 104. This shaping of the units 106 and 114 to fit snugly against the units that they are attached to is desirable, but not necessarily essential. A compact, generic unit could be equipped with a clip or with a velcro fastener and a short length of serial cable and could be attached to any device having a serial port, and a modified model could be designed to work with industry-standard, IBM PC compatible Centronics or Apple compatible SCSI parallel ports, as well as RS-232-C serial ports. The connectors 108 and 116 in the preferred embodiment of the invention provide industry-standard RS-232-C serial ports, complete with all of the connections shown at 505 in FIG. 5. Of the standard signals the DTR (data terminal ready), DSR (data set ready), TX (transmit data), and RX (receive data) are shown in the figure, along with a ground connection. Other standard signals could also be included as well. As shown, the units 104 and 106 in the preferred embodiment are configured as DTE (data terminal equipment) and generate the DTR signal and receive the DSR signal, but one or both units 104 and 106 can be configured as DCE (data communications equipment) either permanently or by software actuation of the DTE/DCE signal line 531 which reconfigures the serial port driver 508 (which, for example, can be a MAXIIN programmable DTE/DCE transceiver, Model MAX 214). The microprocessor 600 and driver 508 could also perform tests and then configure the driver 508 to DTE or DCE, whichever proved to be correct for the particular printer or host. A DTE/DCE user-actuatable switch could also be provided for flexibility.

FIG. 5 presents an overview circuit and logic diagram of the digital logic 500 of both units 106 and 114, which are electrically identical. Missing from FIG. 5 are the details of the transceiver 700 which appears in FIG. 7 and will be described below.

A microprocessor 600 illustratively could be a Microchip Technology, Inc. PIC17C43 having an internal 4K instruction EPROM and containing 454 bytes of data memory. The microprocessor 600 is powered by a battery 510 which supplies current through an ON/OFF switch 504 to a +5 volt regulated supply 502 which feeds the VCC input of the microprocessor 600. If desired, the supply 502 may also receive current directly from either the DTR or the DSR data leads from the host through one or the other of the two transistors 506 and through a resistor 510 when one of the two transistors 506 is actuated by either the CHG1 or the CHG2 signal lines 507 or 509 flowing from the microprocessor 600. Accordingly, in some situations the battery 510 may not even be needed, or may need to be replaced only rarely. See, generally, U.S. Pat. No. 4,866,602 which issued to John C. Hall on Sep. 12, 1989 which explains in much more detail how power for such a peripheral device may be drawn from the terminals of an RS-232-C port.

Since the microprocessor 600 has only one serial input SIN and only one serial output SOUT, and since it needs to connect to both the host computer over the RS-232-C link 505 and also to the radio transceiver 700 over the XMT DAT and RCV DAT data lines, the preferred embodiment utilizes a multiplexer 512 to switch the serial input (labeled RX) and the serial output (labeled TX): to the serial port driver 508 receive line 514 and transmit line 516 when the multiplexer 512 is switched to position A; and to the RCV DAT line 515 and the XMT DAT line 517 leading to the transceiver 700 (FIG. 7) when the multiplexer 512 is in position B. The microprocessor 600 incoming signal lines DSR (data set ready) 522 and DTR (data terminal ready) 524 need not be switched, since the packetized nature of the radio transceiver data means that there is no need for the hardware flow control lines DSR and DTR to be utilized during RF transmissions and receptions.

The microprocessor 600 generates a PWR signal 524 which can turn the transceiver 700 on and off. The microprocessor 600 also generates an XMT/RCV signal 526 which selectively powers the transceiver 700's transmitter 702 with an XMT PWR signal 519 and selectively powers its receiver 708 with an RCV PWR signal 518. The microprocessor 600 also generates a signal FREQ 528 to determine the operating frequency of the transceiver 700. This signal is translated by logic 800 into separate FREQ A 520 and FREQ B 522 signals for the transceiver 700. The microprocessor 600 can also power down the serial port driver 508 with an RS-232-VCC signal 530, and the microprocessor 600 can power itself down as well, to conserve battery power.

Each of the units 106 and 114 is equipped with four light emitting diodes. Three light emitting diodes LED A, LED B, and LED C 532 indicate by their illumination which of three possible radio communication linkages to printers are in their "link" state, indicating that the unit is linked to the respective printers. A fourth LED is a low battery indication LED 534 which the microprocessor 600 illuminates in response to a LOW BATT signal 536 that is generated by the supply 502 when the battery voltage drops excessively low.

The manual multi-position switch 538 enables a user to set which of the three channels A, B and C is the active channel connecting to one of three printers that is currently in use. For example, a user of the hand-held assembly 104 shown in FIG. 1 can, by actuation of the switch 538, easily switch to any one of three different remote printers and units, such as the printer 102 and unit 108 and two other printers (not shown) each having its own unit (not shown) comparable to the unit 106.

Another manual switch 540 signals to the microprocessor 600 whether the unit 106 or 114 is a master or transmitting unit TX, normally hooked to a host computer (such as the hand-held assembly 104) and originating all transmissions or data, or whether it is a slave or receiving unit RCV, normally hooked to a printer (such as the printer 102) and normally receiving communications from a remote host and master TX unit. This switch 540 is normally set when unit 106 or 114 is first attached to its accompanying device. In some situations, the processor 600 may be able to test for a host or printer and automatically set its TX or RCV mode accordingly, and then this switch may not be needed. The unit 114, which hooks to a hand-held bar code scanner, keyboard, and printer assembly 104, would normally be configured as a TX unit, since it is a source of data. Likewise, the unit 106, which normally hooks to a printer 102, would normally be configured as a RCV unit, to receive information from a TX unit.

The LEDs 532 will blink to signal a break or disconnect or failure of a given linkage. A reset pushbutton 542 is provided to reset the unit and to cause a new linkage to be established. It is necessary to press the reset pushbuttons on the TX and RCV units that are to be linked at roughly the same time to reestablish a linkage. Alternatively, repositioning the selector switch 538 will also cause a new linkage to be established in response to an error condition at a given switch position or when there is no linkage at a given switch position.

Since the units 106 and 114 may either be battery powered or they may draw power from battery powered hosts or printers, in either case, power conservation is an important element of the design of the present invention. It has been noted above that the microprocessor 600 may shut down the serial port driver 508 and also the transmitter 702 and receiver 708. The microprocessor 600 may also put itself into a sleep mode to conserve power during idle periods. The transmitter 702 needs only be on when a data stream is actually being transmitted, and is off at all other times. Likewise, the receiver 708 is only on when incoming data is expected. A unit in the RCV mode, which is waiting for data from a TX unit, after a time may power down its receiver most of the time and only turn its receiver on periodically for brief intervals at predetermined times when a data transmission may be initiated by the master unit, by prearrangement of the programming.

Assume for the moment that the unit 114 is configured in the TX mode to be the master unit, receiving data from a host computer, and 114 communicating bidirectionally with its host computer over the RS-232-C serial communications link 505. Information is accepted by the microprocessor 600, formed into data packets containing address data and error detection data, and is sent out over the XMT DAT line 517 to a transmitter 702 which turns its carrier on and off in synchronism with the incoming one and zero data bits. These data packets are received by the unit 106, assumedly in the RCV mode and connected to a printer, where the data flows in the RCV DAT line 515 to the microprocessor 600, is depacketized, and is sent to the printer over the TX line 519. In the RCV unit, the microprocessor 600 performs error checking and responds to the TX unit with a returned ACK packet if the data is correct or with a NAK packet if the data is not correct, thus calling for a retransmission of the same data a second time in the case of errors. If several transmissions in a row fail, both the transmitting TX unit and the receiving RCV unit switch simultaneously to a second frequency and try again. If all else fails, a link error is declared, and an appropriate light emitting diode 532 in each of the two units blinks to warn the user of the error condition. In this manner, the two units work together to select the most advantageous frequency that provides for the accurate transfer of information.

When a unit 106 or 114 is in the TX mode, the transmitter 702 is never active until data, in the form of a completed data packet, is assembled and is ready to be sent. The data packet itself forms the modulation stream for the CW transmitter 702. Accordingly, the unit never normally sits in unattended CW mode generating an unmodulated carrier. The receiver 708 of a unit in TX mode is only active for a brief moment after a transmission has taken place, to listen for an incoming ACK or NAK packet.

When a unit 106 or 114 is in the RCV mode, the receiver 708 is normally active until a packet has been received and a return ACK or NAK packet is ready to be sent back to the TX unit. Then the receiver is powered off until after the transmission of the ACK or NAK packet has been completed. The receiver in such a unit is also powered down during power saving modes of operation, powering up only periodically to seek incoming data, as will be explained. As will be explained in conjunction with FIG. 7, the transmitter receiver portions, both as to power, frequency, data, or timing are driven and controlled directly from ports on the microprocessor 600.

Figure 7A:
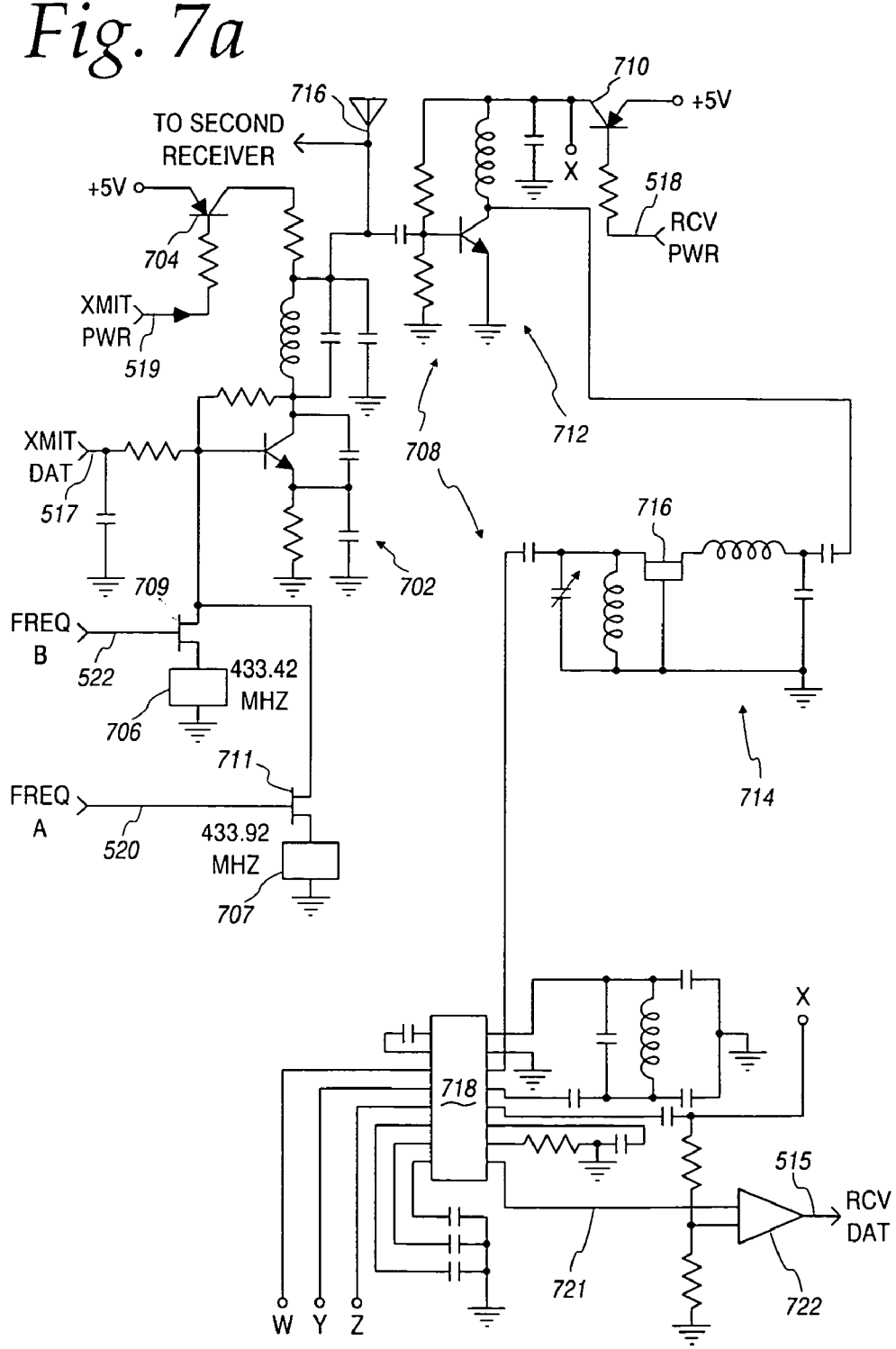
FIG. 7 is a circuit diagram of the transceiver 700 that is part of the serial communications radio unit 500 (FIG. 5)
Figure 7B:
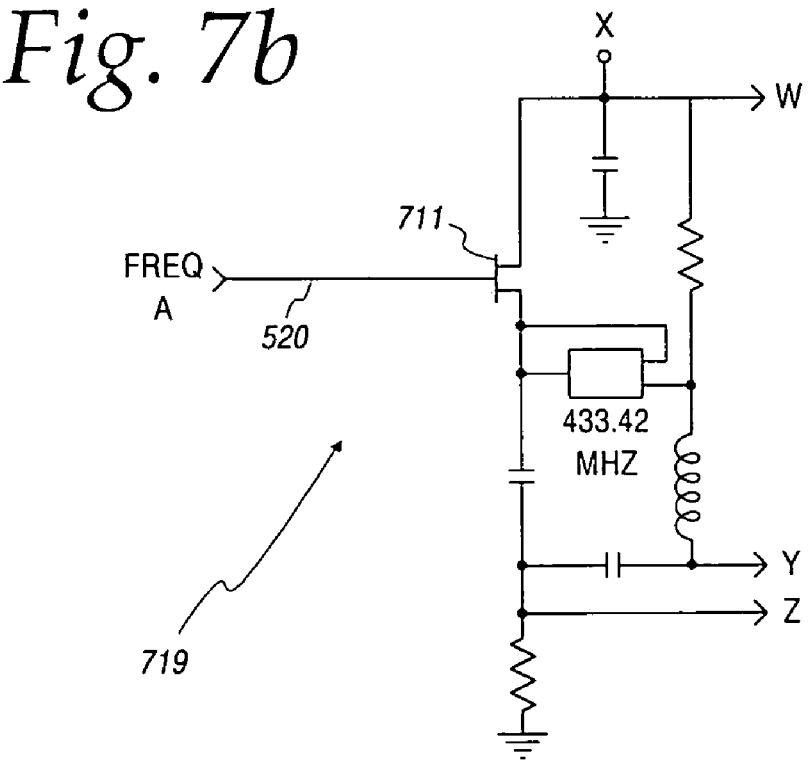
Figure 7C:
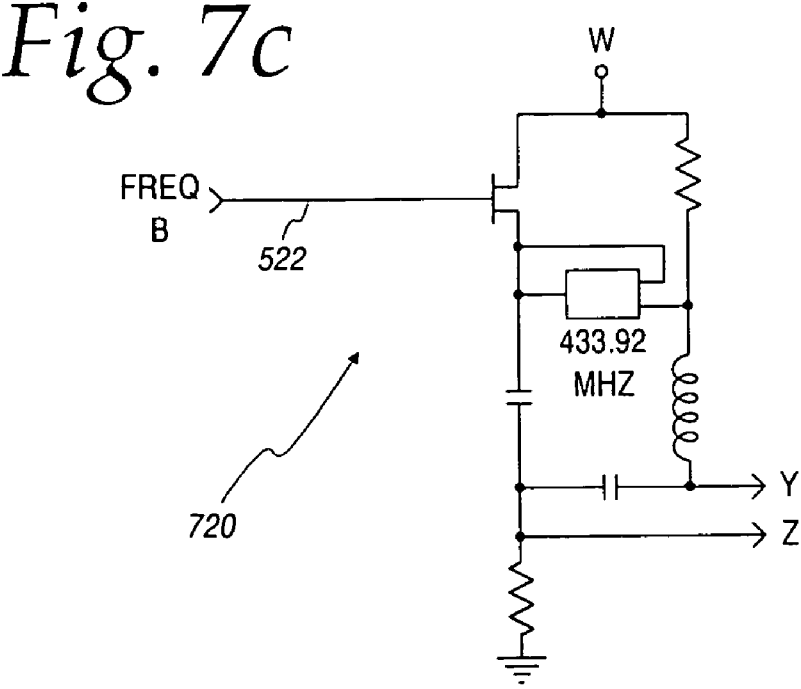
Figure 8:
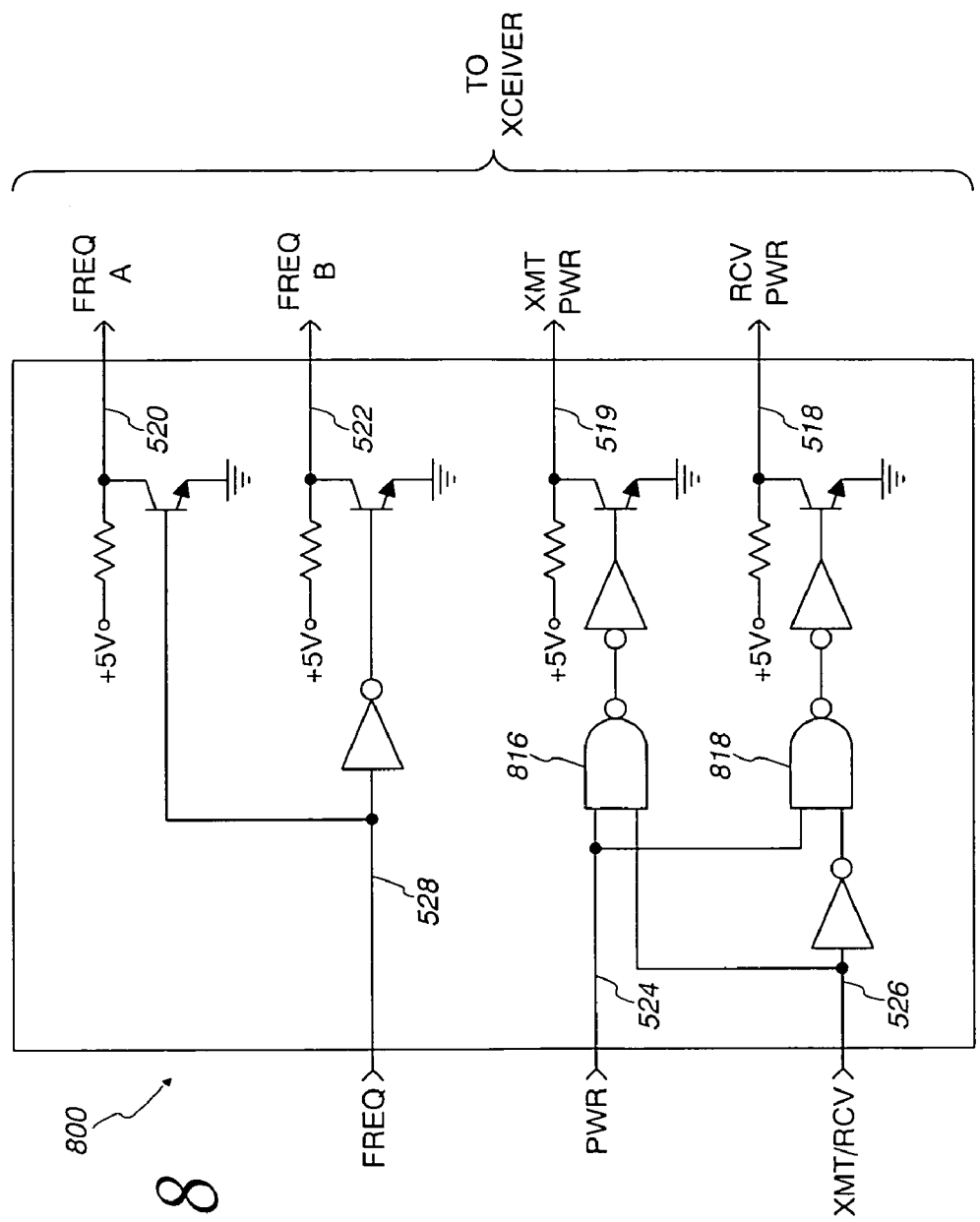
FIG. 8 is a logic and circuit diagram of the power and frequency control element 800 of the serial communications radio unit 500 (FIG. 5)

With reference to FIG. 8, the logic 800 receives the signals FREQ 528, PWR 524, and XMT/RCV 526 from the microprocessor 600. The FREQ signal 528 indicates which frequency is to be selected. The PWR signal 524 indicates when power is to be applied to the transceiver 700. The XMT/RCV signal 526 determines whether the transmitter or receiver is to be powered. The illustrative logic shown in FIG. 8 simply combines these signals and generates from them the XMIT PWR 519 and RCV PWR 518 signals for the transceiver 700. The FREQ signal 528, when high, becomes the FREQ A signal 520 and when low becomes the FREQ B signal 522. The XMT PWR signal 519, which powers up the transmitter 702 (FIG. 7), is generated by the gate 816 when the XMT/RCV signal 519 and PWR signal 524 are high; the REC PWR signal 518, which powers up the receiver portion 708, is generated by the gate 818 when XMT/RCV signal 526 is low and the PWR signal 524 is high.

Figure 6:
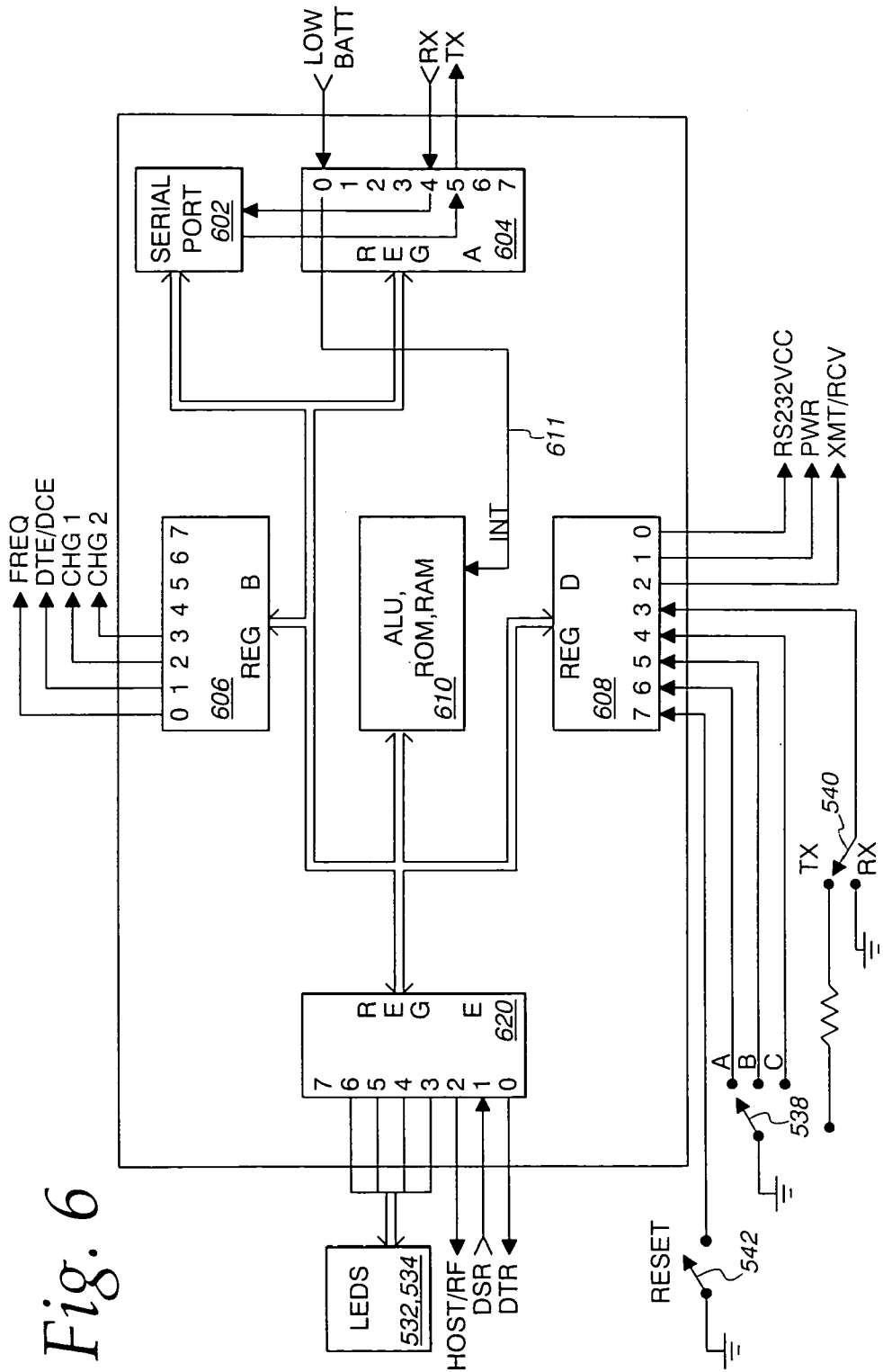
FIG. 6 is a block diagram of a microprocessor 600, illustrating its internal components and how they interconnect to other elements of the serial communications radio unit 500 shown in FIG. 5.

FIG. 6 shows some internal details of the microprocessor 600 and illustrates a preferred way in which signals may be routed into and out of the microprocessor to and from the destinations shown more completely FIG. 5. In particular, FIG. 6 shows the internal serial port 602, internal registers 604, 606, 608, and 620, and the various pin connections of the registers to the signals within the circuitry 500 shown in FIG. 5. Many other arrangements or signals are possible, and a different microprocessor might call for a very different arrangement. Bit positions 4 and 5 of register A 604 connect to the internal serial port 602, as shown, and bit position 0 of register A 604 connects to an internal interrupt connection within the arithmetic logic unit 610.

The transceiver 700 is shown in FIG. 7. It receives the XMIT DAT signal 517 which provides the data to be transmitted as well as the XMIT PWR signal 519 which powers on a transmitter 702 whenever a data transmission is actually occurring. It generates the RCV DATA signal 515 which presents the received data whenever its receiver 708 is powered on by the RCV PWR signal 518. Clearly, the transceiver 700 could be implemented in many different ways, so the one shown is illustrative.

The transceiver 700 of FIG. 7 contains a transmitter 702 which is a simple RF oscillator powered on by the transistor 704 in response to the XMIT PWR signal 519. The RF output signal is applied to an antenna 716 and is broadcast into the air. The symbolic antenna 716 in FIG. 5 corresponds to either the antenna 110 or the antenna 115 shown in FIG. 1.

If the FREQ A signal 520 is present, asking for a first frequency, a transistor switch 711 connects a surface acoustic wave resonator 707 to the transmitter oscillator to determine the frequency of transmission. The resonator 707 has a fixed frequency of 433.92 MHz. Accordingly, the frequency A is 433.92 MHz. If, alternatively, the FREQ B signal 522 is present, then an alternate transistor 709 connects up a surface acoustic-wave resonator 706 having a resonant frequency of 433.42 MHz. Accordingly, the second frequency B is 433.42 MHz. These two frequencies are close enough together so that no re-tuning of the antenna 716 is necessary.

The transceiver 700 also contains a receiver 708 whose power is switched on and off by a transistor 710 in response to the RCV PWR signal 518. A preamplifier, 712 tuned broadly enough to pass both the frequency 433.42 MHz. and the frequency 433.92 MHz., feeds the incoming radio frequency signal from the antenna 716 through a sharply-tuned filter 714, which contains a surface acoustic wave filter 716, and into an integrated-circuit remote control receiver 718, which illustratively could be a model UAA320AT, available from Philips Semiconductors. The filter 714 is tuned broadly enough to pass both frequencies.

The receiver 718 requires an intermediate frequency input on the terminals Y and Z. When the FREQ A signal 520 is present, it turns on local oscillator 719 which oscillates at 433.42 MHz. When the input signal FREQ B 522 is present, it turns on alternate local oscillator 720 which generates a 433.92 MHz. local oscillator signal. Accordingly, the local oscillator is always 500,000 cycles away from the frequency that is being received. The receiver 718 has its intermediate frequency amplifier tuned to this intermediate frequency of 500,000 cycles per second. It detects and presents an output signal at 721 which is then amplified by an operational amplifier 722 into a clean square wave signal called the RCV DAT signal 515 which is presented to the microprocessor 600 through the multiplexer 512 as the incoming radio data signal.

Figure 9:
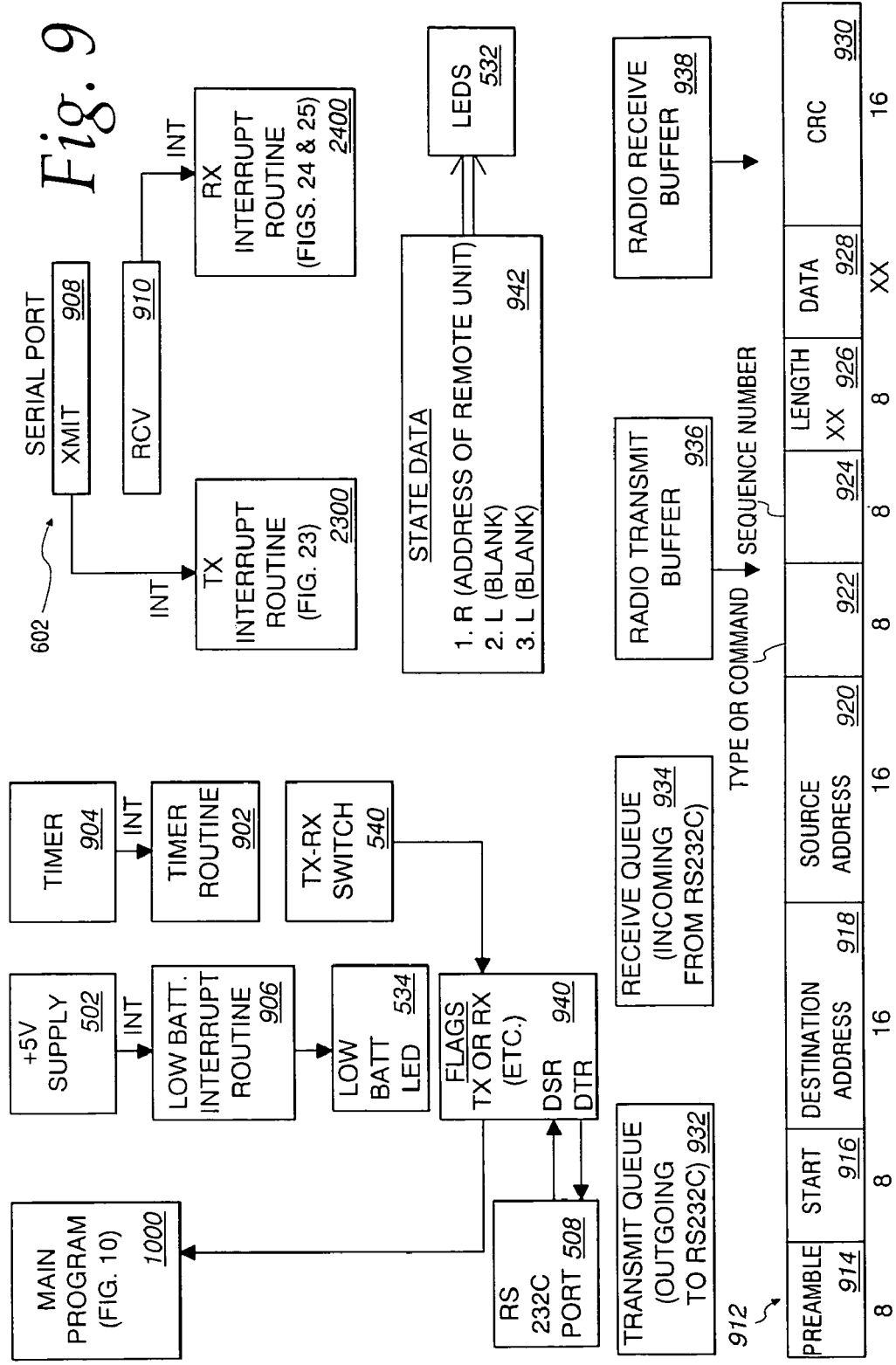
FIG. 9 is a block diagram overview of the software system of the serial communications radio unit 500 (FIG. 5) which controls the operations of the microprocessor 600 shown in FIG. 6.

FIG. 9 is an overview illustration of the software components and of the corresponding data structures, showing diagrammatically how they link into some of the hardware elements of the circuit 500 shown in FIG. 5.

When the microprocessor 600 is placed into operation, it sets up an interrupt driven TIMER routine 902 which is driven by a hardware timer 904 within the microprocessor 600 to control all timing functions, such as program delays and background timeouts for various operations. A LOW BATTERY INTERRUPT routine 906 is also placed into operation to respond to interrupts supplied by the +5 volt supply 502 and to selectively illuminate the low battery LED 534. The serial port 602 shown in the microprocessor 600 in FIG. 6 actually contains two separate registers, a transmit register 908 and a receive register 910 (FIG. 9) each of which is capable of generating an interrupt. The interrupt generated by the transmit register 908 when it is empty is processed by a TX INTERRUPT routine 2300. The interrupt generated by the receive shift register 910 when it is full is processed by an RX INTERRUPT routine 2400. These two routines respectively control all of the data transmissions and receptions, both to the host computer and printer on the one hand, via RS-232-C ports, and also as packets sent to the radio links on the other hand.

To facilitate transmission and reception, four queues or buffers are shown symbolically in FIG. 9. For RS-232-C transmission and reception to and from the host and printer, a transmit queue 932 is provided and a receive queue 934 is also provided. To facilitate radio transmissions of packets, a radio transmit buffer 936 is provided and a radio receiver buffer 938 is also provided.

At 912, the formatting of the data packets that can appear in the radio transmit and receive buffers 936 and 938 is illustrated.

It is to be understood that while four separate buffers or queues are shown in FIG. 9, the small amount of RAM available in the microprocessor 600 may require that some of these queues and buffers be taken down at certain times when they are not needed to make room for other queues and buffers which are needed at such times.

The format of the data packet 912 is as follows:

Preamble 914 (8 bits): A pattern that assists the receiver in synchronizing the reception of a packet and that identifies the head end of a packet. May be repeated multiple times.

Start 916 (8 bits): A unique pattern that signals the start of a packet.

Destination Address 918 (16 bits): The address of a remote unit, which was transmitted to this unit during the initial linking handshaking procedure. FFFF hexadecimal if there is no linkage to a remote unit.

Source Address 920 (16 bits): The address of this unit. Retrieved from ROM or EPROM storage.

Type of command 922 (8 bits): The type of packet. For example:

Link Request type packet—a master TX unit is seeking to link with another slave RX unit.

Link Response type packet—a responding slave or RX unit is willing to link.

Data Frame type packet—a packet sending data. More data to follow.

Last Data Frame type packet—a packet sending the last data in a message.

ACK Data Frame and ACK Last Data Frame type packets—packets acknowledging correct reception of a preceding packet travelling the other way. (May contain return data in a two-way system.)

NAK Data frame and NAK Last Data Frame type packets—packets reporting an error. (May contain return data in a two-way system.)

Send Request type packet—a unit has nothing to send but is ready to receive returned data. (For use in a two-way system.)

Sequencer Number 924 (4 or 8 bits): A packet sequence number, for detecting missing packets.

Length 926 (8 bits): The size of the data portion of the packet, in bytes.

Data 928 (variable): The transmitted data bytes.

CRCC-16 930 (16 bits): A 16-bit long cyclic redundancy error check number computed from the remainder of the data packet, provided so that the receiver can check for transmission errors by recomputing this number and comparing the computed number with the transmitted number.

FIG. 9 also illustrates some of the more important flag variables 940 and some of the more important system state data 942, the latter corresponding to each of the three permissible linkages and each of the three light emitting diodes 532.

Included among the flags 940 is a TX or RX Or RX flag bit which reflects the state of the TX/RX switch 540 and which indicates whether the unit is a master TX unit or a slave RX unit.

Also, included is the data set ready, or DSR, flag which flows in from the serial port driver 508 and originates in either the host computer or the printer where, depending upon the state of the serial port driver 508 and whether it is configured as a data terminal equipment DTE or data communications equipment DCE by the DTE/DCE signal 531 (see FIG. 5), the DSR flag may originate as a DSR signal received from a DCE host or as a DTR signal received from a DTE host.

A DTR flag, generated by the microprocessor 600, flows outward through the serial port driver 508 and is perceived by the host computer or printer either as a DTR signal, if the host or printer is configured as a DCE device, or as a DSR signal, if the host or printer is configured as a DTE device.

These last two signals control the flow of data. The DTR flag commands the host or the printer to start or stop sending data. The termination of the DTR signal, to stop the flow of data, must occur early, before the receive queue 934 is full, because the data flow may not stop instantaneously. Likewise, when the host computer or printer generates the DSR signal, this becomes a DSR flag which causes the transfer of information from the transmit queue 932 to be halted temporarily until the printer or host computer can accept more incoming data.

The state data 942 exists in three sets of data, numbered 1, 2, and 3, each corresponding to one of the light emitting diodes or LEDs A, B, and C 532 and to one of the switch 538 positions A, B, and C, shown in FIG. 5. The units 106 and 114, when acting as master TX units, are able to establish or maintain linkages with up to three remote devices or printers simultaneously. State data is required for each of these devices. The first data item of this state data, an R or an L, indicates by an L that there is no linkage to a remote device, and that when the linkage switch 538 is placed into a corresponding position, the unit will attempt to link with whatever remote slave RX device is available and is also attempting to link to a master TX unit. The letter R indicates that a linkage has been established, and that the unit is ready to communicate data to a remote RX unit. In this case, the address of the remote RX unit is stored in the state data for use as element 913 of all transmitted data packets 912 to serve as the address of the destination unit. Each unit has its own unique source address, programmed into ROM or EPROM memory, which goes into every packet 912 at location 920. When a TX unit is attempting to link up to a remote unit, the unit broadcasts link request packets in which the 16 bit destination address 918 is set to all binary ones or FFFF hexadecimal.

Figure 23:
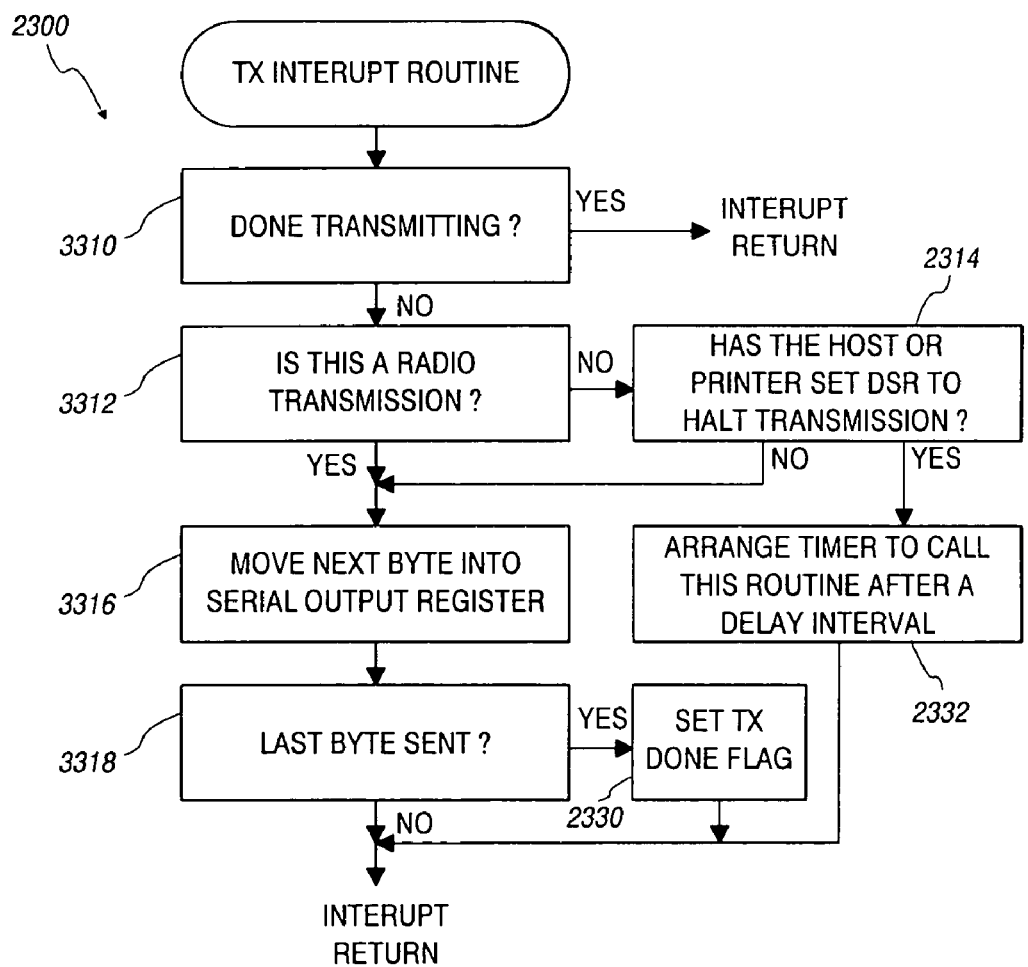
FIG. 23 is a block diagram of a TX INTERRUPT routine 2300 which enables a serial communications radio unit 500 to transmit data over a radio link or over an RS-232-C serial communications link.
Figure 24:
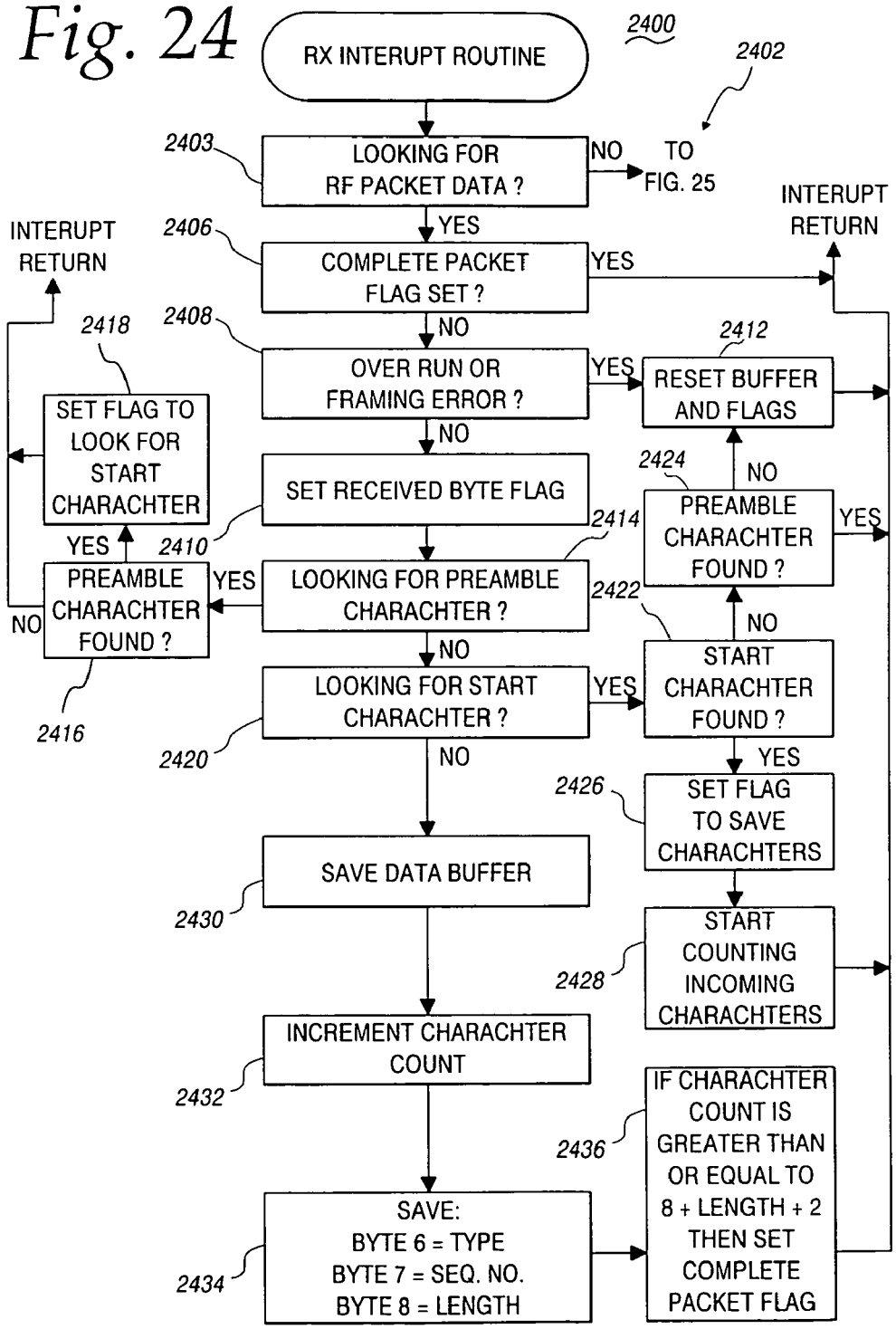

FIGS. 10 through 25 present a complete block diagram of all the software that controls the operation of the microprocessor 600 within the units 106 and 114. Briefly summarized, FIG. 10 presents an overview block diagram of all the software. When a unit is designated as a master or TX unit by the switch 540 being in the TX position, a TX routine 1100 governs unit operations. The TX routine 1100 is presented in overview in FIG. 11, with details presented in FIGS. 12 through 15. When a unit is designated as a slave or RX unit by the switch 540 being in the RCV position, to designate the unit a slave unit suitable for use with a printer, for example, an RX routine 1600 governs its operation. The RX routine 1600 presented in overview in FIG. 16, with details presented in FIGS. 17 through 21. In case of an unrecoverable error in the radio linkage between two units, a LINK ERROR routine 2200 presented in FIG. 22 takes control. FIG. 23 presents the interrupt driven TX routine 2300 which transmits data either over a serial port linkage or over a radio linkage. FIGS. 24 and 25 present the details of the interrupt driven RX routine 2400, the radio packet transmission details of which are shown at 2402 in FIG. 24, and the RS-232-C character transmission details at which are shown at 2404 in FIG. 25.

Referring now to FIG. 10, the preferred embodiment of the present invention contains four independent programs. A main program 1000 is placed into operation when the microprocessor is first powered up and then runs continuously in the background. At 1002, this program initializes the system, performing such tasks as disabling interrupts, initializing RAM memory, initializing the I/O ports, initializing the system variables, setting up the internal UART or serial communication ports, setting up a 1,000 cycle timer for driving the LEDs, and also initializing a clock timer which is interrupt driven. This program then enables the interrupts and allows normal interrupt driven program operation to proceed.

Figure 16:
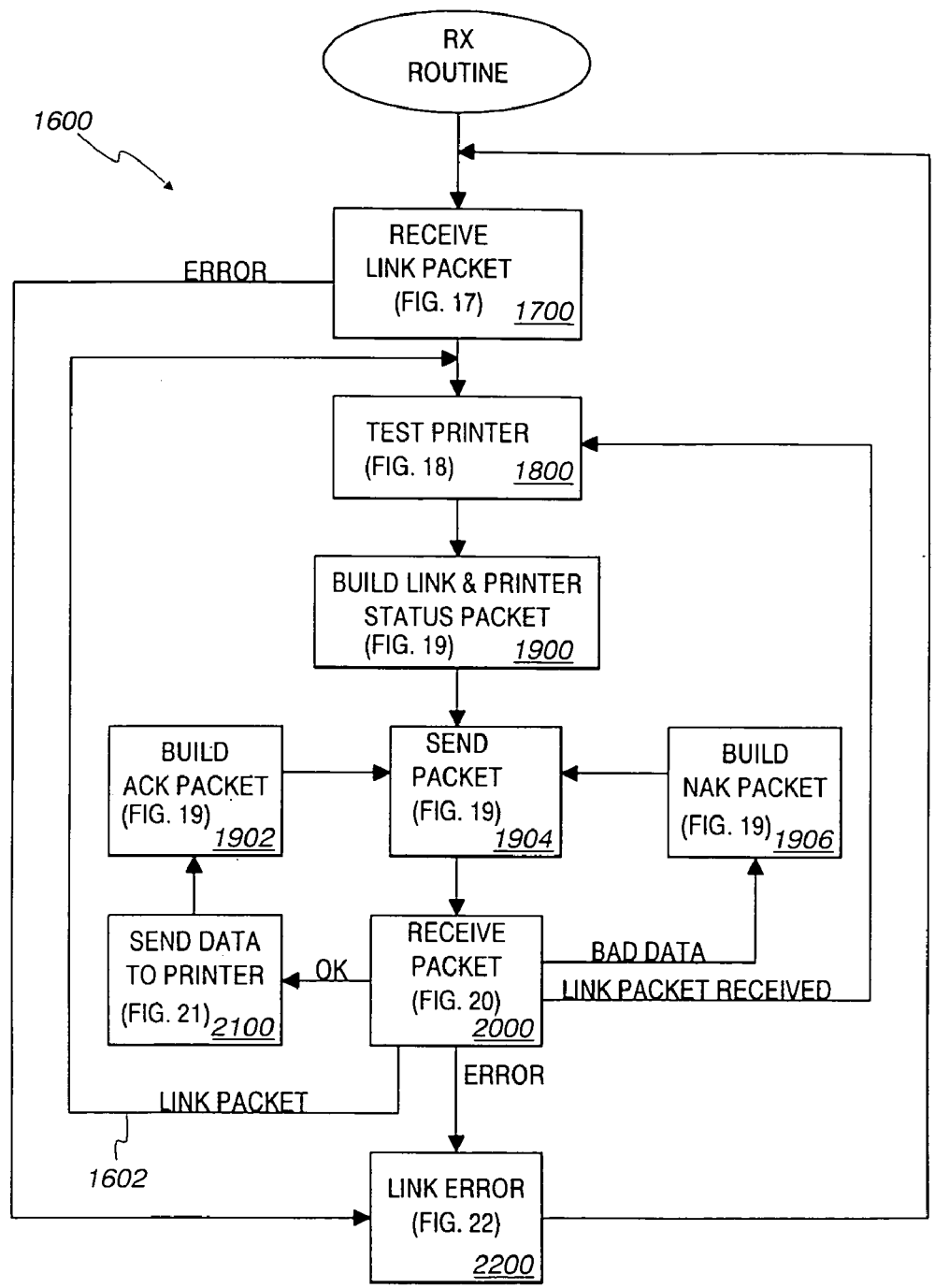

At 1004, the program tests the state of the switch 540 to see whether the unit is in the TX mode, meaning it is a master or host unit, or RX mode, meaning it is a slave or remote co-printer unit. If it is in the TX mode, then the TX routine 1100 is placed into operation, the details of which appear in FIG. 11. If it is a slave RX unit, then the RX routine 1600 is placed into operation, the details of which are shown in FIG. 16. At any time when the program 1100 or 1600 senses that the link between the master and the slave unit has been broken, the LINK ERROR routine 2200 is placed into operation, the details of which appear in FIG. 22. After the error has been processed, program control is returned to the routine 1100 or 1600 which was running previously. Accordingly, a master unit hooked to a host computer is controlled by the TX routine 1100, while a slave unit that is feeding a printer is controlled by the RX routine 1600.

The remaining four interrupt driven routines are also shown in FIG. 10. A LOW BATTERY INTERRUPT routine 906 responds to a LOW BAT signal 536 (FIG. 5) which is generated by the +5 volt supply 502 whenever the battery voltage drops below a predetermined minimum acceptable level. In response the program 906 turns on the low battery LED 534. When the low battery signal terminates, the LED 534 is extinguished.

The initialization program 1002 sets up a hardware timer to generate a timer interrupt which triggers periodic execution of a TIMER routine 902. The TIMER routine 902 can then advance various counters associated with time delays and with software established timeouts, as will be explained at later points in this description. Each time the TIMER routine 902 is placed into operation, it simply increments or decrements the various timers under its control and sets or clears appropriate flags as signals to the TX routine 1100 or the RX routine 1600 as to when a time delay has expired or when a timeout has occurred.

The remaining two interrupt driven routines are those associated with serial port transmission and reception. The TX INTERRUPT routine 2300 and the RX INTERRUPT routine 2400 were already described in brief overview in conjunction with the description of FIG. 9. In brief summary, the TX INTERRUPT routine 2300 is placed into operation each time a character is completely sent by the transmit register 908, and it loads a new character into the transmit register 908 or signals to the background software that all the characters to be transmitted have been processed. The RX INTERRUPT routine 2400 is placed into operation each time a character is received by the receive register 910, and it removes the character from the receive hardware register 910 and places it into an appropriate one of the receiving queue 934 or receive buffer 938 and signals the background software when a character has been received and when a complete packet 912 has been placed into the radio receive buffer 938.

Figure 11:
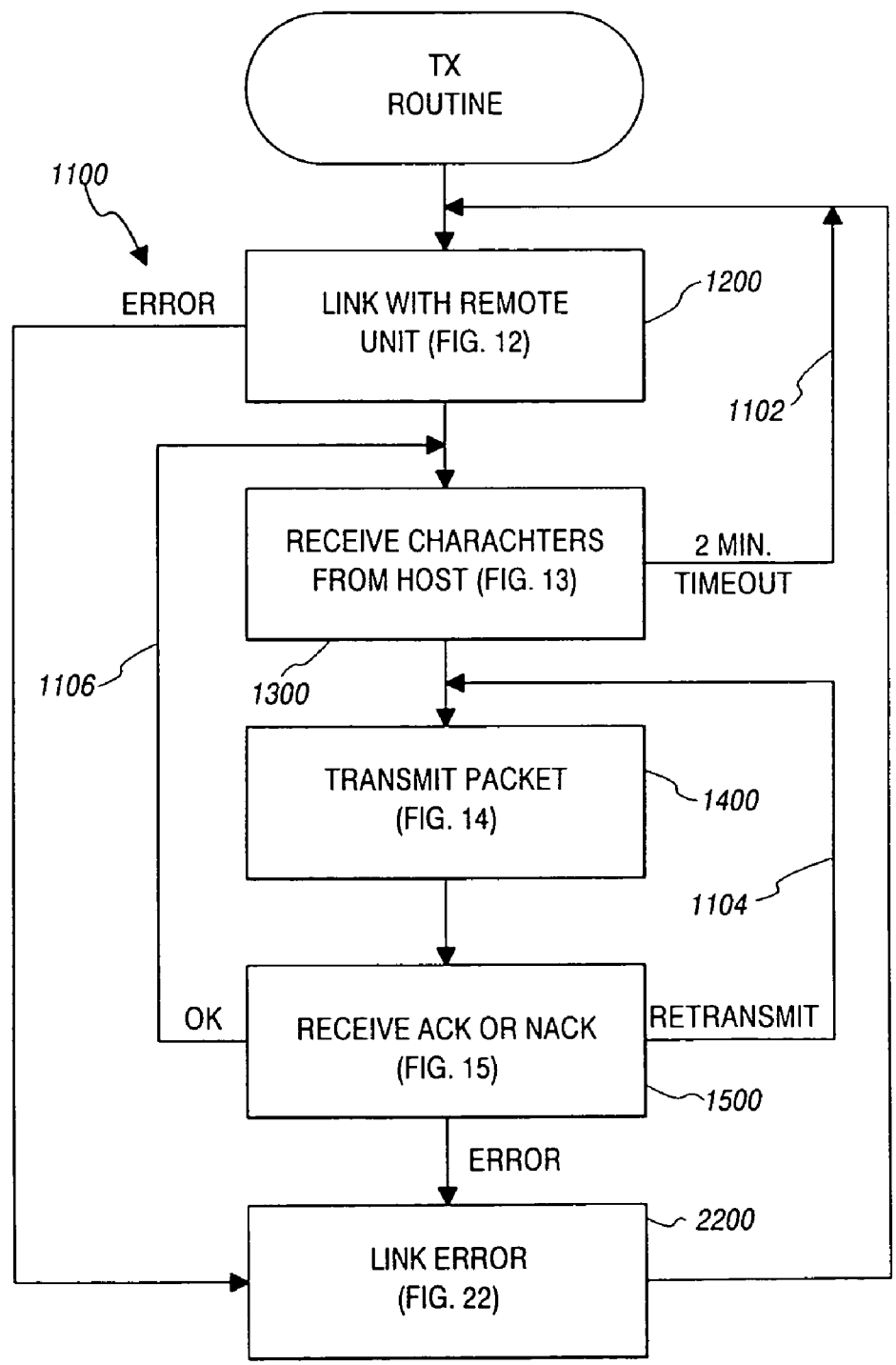
FIG. 11 is a block diagram of the TX routine 1100 which manages the serial communications unit 500 when it is in the TX or master mode, as when connected to a host computer.

Referring now to FIG. 11, an overview block diagram is presented of the TX routine 1100. This routine is placed into service and runs in the background continuously in any unit which is switch adjusted to be a master or TX unit. Such a unit is typically connected to a host computer and initiates data transmissions to a remote, slave, or RX unit which typically is connected to a printer.

Program control begins with a LINK WITH REMOTE UNIT routine 1200. The routine 1200 continuously sends out or broadcasts link request type radio packets in an effort to seek a linkage with a slave unit, presumably one connected to some printer. A packet is sent out every ⅝ths of a second. If no response is received after twenty such packets are sent out, or after about 12 seconds have elapsed, then the LINK ERROR routine 2200 is called upon to signal an error in linkage by flashing the corresponding light emitting diode A, B, or C 532. To recommence linking, the user may either actuate a reset switch 542 on both the TX and RX units or rotate the selector switch 538 to another position or to another position and then back again, either of which actions will restart the LINK WITH REMOTE UNIT routine 1200.

A RECEIVE CHARACTER FROM HOST routine 1300 next proceeds to await incoming characters from the host computer. If none are received within two minutes, program control is returned over the path 1102 to the LINK WITH REMOTE UNIT routine 1200 which again exchanges a link request and a link response type packet with the remote slave unit before returning to the RECEIVE CHARACTERS FROM HOST routine 1300.

When characters flow in from the host, the RECEIVE CHARACTERS FROM HOST routine 1300 accepts sufficient characters to form a packet and then terminates the DTR signal 524 flowing to the host to block the flow of further characters until the characters received can be sent by radio packet to a slave or RX unit.

Program control then commences with the TRANSMIT PACKET routine 1400 which forms the host computer data into a data frame packet formatted as indicated at 912 in FIG. 9 and transmits the packet, together with a sequential sequence number 924 and a computed cyclic redundancy check number 930, to the remote slave unit. The RECEIVE ACK or NAK routine 1500 is then placed into operation to await the receipt back from the remote unit, within ⁴⁄₁₀ths of a second, of an ACK data frame, signaling the packet was successfully received, or a NAK data frame, signaling it was not successfully received. If the data packet was not successfully received, then program control returns over the path 1104 back to the TRANSMIT PACKET routine 1400.

As will be explained, if two successive transmissions both produce NAK responses, both the master TX unit and the remote RX unit switch simultaneously to a second frequency and attempt to send the packet again. In response to two more such failures, a link error is declared, and the LINK ERROR routine 2200 is placed into operation.

A link error is also declared if twenty packets are sent out and no ACK or NAK is received.

Any time an ACK is received back in response to a packet transmission, program control follows path 1106 back to the RECEIVE CHARACTERS FROM HOST routine 1300 at which point the DTR signal is enabled and further characters, if any, are accepted from the host computer and formed into a packet for transmission.

Program control then continues to cycle between the routines 1300, 1400, and 1500 as messages are transmitted from the host computer to the master TX unit, packaged into packets, transmitted by radio, acknowledged by the RX unit, and sent on to the printer at the other end of the system.

Figure 12:
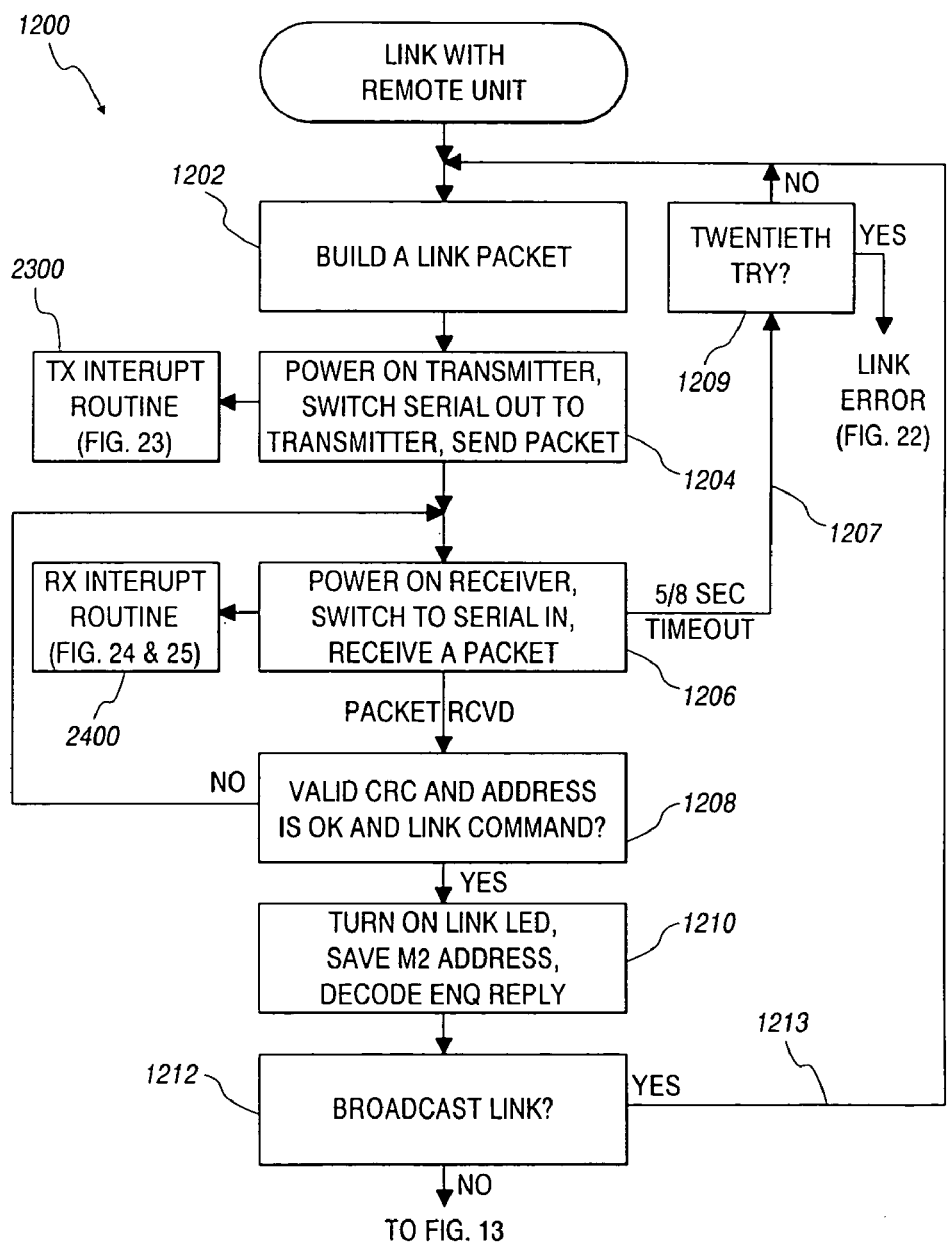
FIG. 12 is a block diagram of the LINK WITH REMOTE UNIT routine 1200 which guides such a master unit through the steps of slave remote unit.

The LINK WITH REMOTE UNIT routine 1200 is shown in more detail in FIG. 12. At 1202, a link request type packet is constructed in the radio transmit buffer 936. With reference to the packet format at 912, this request packet contains a destination address 918 that is all binary ones or FFFF hexadecimal, and it contains the source address 920 of the master or TX unit that is preparing to transmit it. The type or command 922 is a number which identifies this as a link request packet. The sequence number can be any value and can conceivably be zero at 924, and the length 926 would be zero. There is no data at 928.

In this and all other data packets, the cyclic redundancy check number 930 is a number that is computed in a special way from the remaining contents of the packet and that is then placed as a sixteen bit number at the end of the packet at 930. When the receiver receives the packet, the CRC number is recomputed from the contents of the packet and is then compared with the one transmitted. Any difference in the computed number from that transmitted is a guarantee that some error occurred in the transmission. The computation and use of cyclic redundancy check numbers is well-known in the art. Briefly described, it is a form of diagonal parity computation which includes some mathematical computations so as not to give an improper check in the case of all zero data or all one data or some other pattern that is likely to be encountered.

At step 1204, the transmitter 702 is powered up and the multiplexer 512 is switched so that the transmit register 908 is connected to the transmitter 702. After a delay of ⅒th of a second, the interrupt routine flag TX DONE (not shown) is cleared, and the TX INTERRUPT routine 2300 is placed into operation. The routine 1204 loads the first preamble character of the packet 912 into the transmit register 908 so that the hardware of the microprocessor 600 can send it out as an ON-OFF modulation of the CW transmitter signal. The routine 1204 then idles until the TX INTERRUPT routine 2300 clears the TX DONE flag, to indicate that the last byte of the packet has been successfully transmitted.

Program control then commences with the routine 1206. This routine first powers off the transmitter, then waits for ⁸⁄₁₀₀ths of a second before powering on the receiver 708 and setting a timeout value of ⅝ths of a second as a maximum time to wait for a link response type packet to come back from any slave unit that responds to the broadcast link request. After a further ⅒th of a second delay, the routine 1206 initializes the interrupt-driven operation of the RX INTERRUPT routine 2400, which in response to the receipt of incoming bytes presented by the receive register 910, analyzes them, and when receiving actual packet information, places the packet data into the radio receive buffer 938.

If no packet is received within ⅝ths of a second, then program control follows the path 1207 back to the beginning of the routine where another new link packet is constructed and broadcast. But after the twentieth try, at step 1209, if there is still no response, then a link error is declared, and program beginning of the link with remote unit routine, where a second link packet is constructed and sent out, this one specifically addressed to the tentatively selected remote slave unit. If this second link packet is successfully sent out, and if a valid link response packet is again received, then when the step 1212 is encountered a second time, program control commences in FIG. 13 with the RECEIVE CHARACTERS FROM HOST routine 1300. Note that if the remote printer is not ready, and if the DTR signal 524 has been sent out, the broadcast link step 1212 can also route program control over the path 1213 so that link request and link response packets continue to be exchanged until such time as the remote printer is ready to proceed and the DTR output signal 524 can once again be generated.

Figure 13:
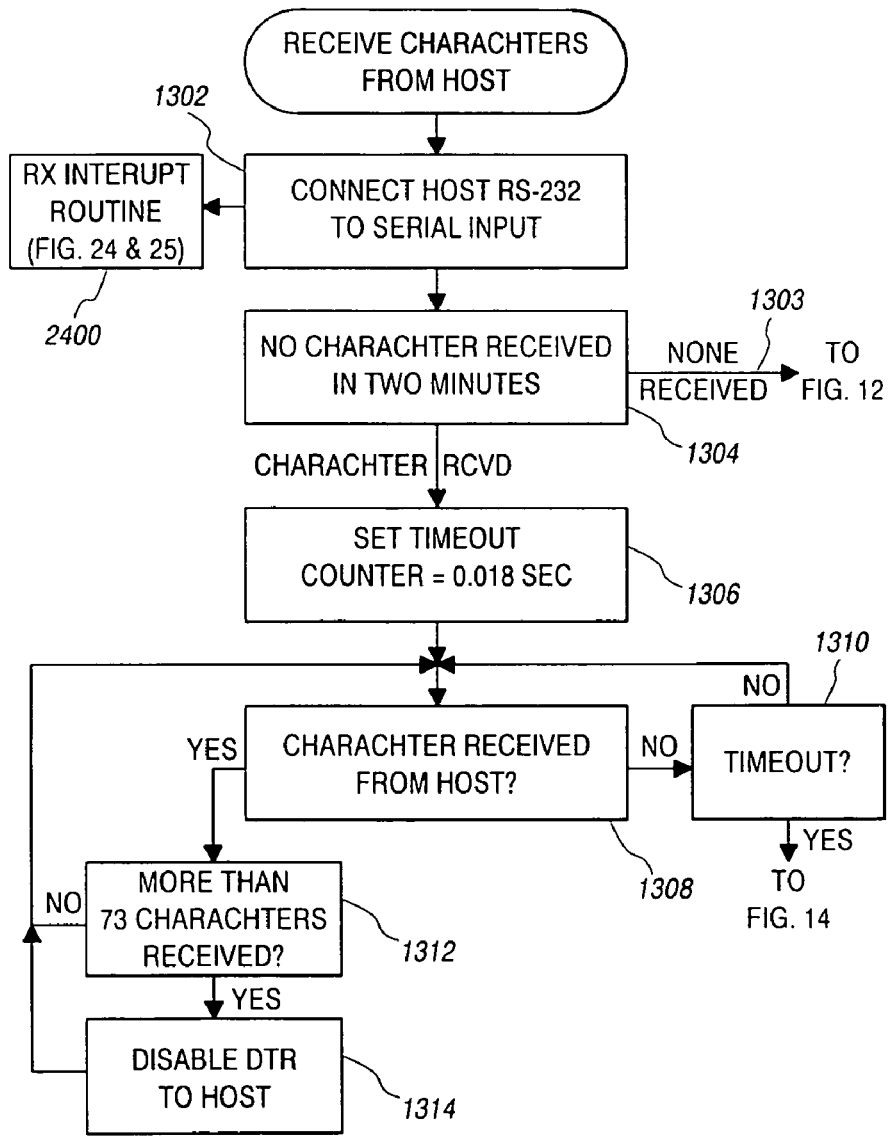
FIG. 13 is a block diagram of the RECEIVE CHARACTERS FROM HOST routine 1300 which, after the master unit is linked with the remote slave, accepts character data from the host computer.

The RECEIVE CHARACTERS FROM HOST routine 1300 is presented in block diagram form in FIG. 13. When this routine is placed into operation, a link has been established with a remote slave unit, and it is now time to send any characters which the host computer wishes to send in the form of packets to the remote unit for presentation to the remote printer or the like.

Program control commences at step 1302 when the multiplexer 512 is actuated to connect the microprocessor 600's RX and TX lines to the data lines 514 and 516 leaping to the serial port driver 508 rather than to the transceiver 700. The microprocessor's DTR signal line 524 is set high to signal a host that data may now be transmitted to the unit. The serial port driver 508 is powered up by means of the signal RS-232-VCC 530. RAM memory is reprogrammed to provide for a receive queue 934 (FIG. 9) to receive the incoming data from the host computer. And a two minute timeout is established such that if no characters are received from the host within two minutes, at step 1304, program control will continue over the path 1303 back to FIG. 12 where a new link request packet is sent out to the remote slave unit. Accordingly, the linkage of the two units is tested and verified periodically, every two minutes, in the absence of host data.

When the first character flows in from the host computer, a new timeout value of 18 thousandths of a second is established at step 1306, and a circular routine beginning at step 1308 is entered to monitor the receive byte flag (not shown) which signals that a character has been received from the host. (See step 2405 in FIG. 25 and the accompanying text.)

Back at step 1302, the RX INTERRUPT routine 2400 was placed into operation such that an interrupt is generated each time a complete character flows in from the host computer and is presented within the receive register 910 of the serial port 602, as is indicated in FIG. 9. The CHARACTER RECEIVED FROM HOST? step 1308 continuously and repeatedly checks the receive byte flag. If it is not set, then step 1310 checks for a 18 thousandths of a second timeout. If no data is received and if there is no timeout, then program control continuously moves back and forth between the steps 1308 and 1310 until either a timeout occurs, indicating the end of the data flow from the host, or a character is received, at which point program control commences with step 1312.

When a character is received, a receive byte flag is cleared, and step 1312 checks to see if more than 73 characters have been received. If so, then the microprocessor 600 lowers the DTR signal 524 to signal the host to stop sending data. Alternatively, the microprocessor 600 can be programmed to send out an XOFF flow control character or to use some other form of hardware or software flow control protocol, as is well known to those skilled in the art. Program control then recommences at step 1308, since assumedly the host computer will not stop sending characters immediately, but will send several more characters before coming to a full halt. Accordingly, characters continue to be received until the 18 Thousandths of a second timeout is exceeded at step 1310. Then program control continues with the formation and transmission of a data packet, as is illustrated in FIG. 14.

Figure 14:
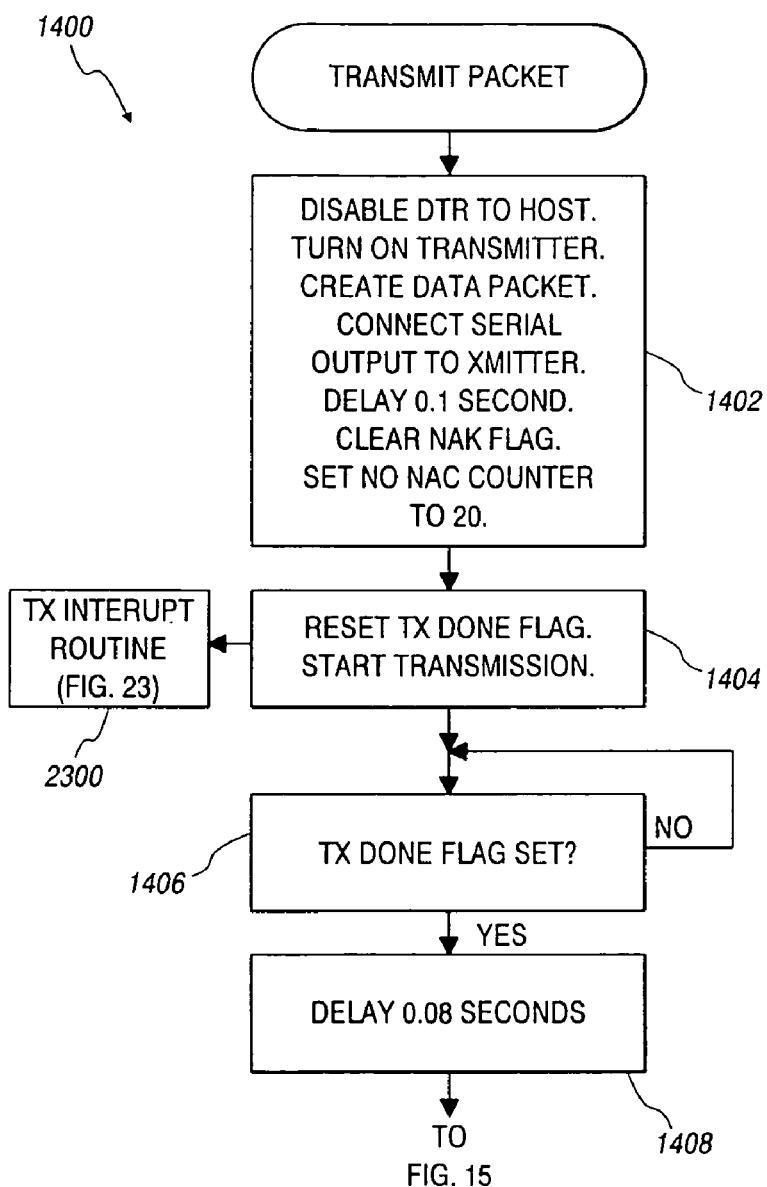
FIG. 14 is a block diagram of the TRANSMIT PACKET routine 1400 which takes the data gathered from the host, forms it into a data packet, and sends it via radio link to the remote slave serial communications radio unit.

FIG. 14 presents a block diagram of the TRANSMIT PACKET routine 1400. After a master unit has received a block of data from the host computer, the TRANSMIT PACKET routine 1400 inserts the data into a packet 912, adds error detection code 930, and transmits it to the remote unit.

At step 1402, the DTR signal 524 fed back to the host computer is terminated, if it has not previously been terminated. The transmitter 702 (FIG. 7) is powered on and the multiplexer 512 is adjusted so that the TX and RX signals from the microprocessor 600 are connected to the XMIT DAT signal line 517 and the RCV DAT signal line 515 which flow to the transceiver 700 in FIG. 7. A data packet is then created within the radio transfer buffer 936 by placing into that buffer: one or more preamble characters 914; the start character 916; the destination address 918 taken from the state data table 942; the source address 920 of the module which was about to send the packet (taken from ROM or EPROM memory); a type or command value (indicating that this is a data frame type packet, in the case where the transmission of data from the host was halted at midstream by the DTR signal 512, or indicating that this is a last data frame type packet if the data transmission from the host halted of its own accord); a sequence number 924 (zero for the first packet sent and then increasing by one count with each additional packet sent); the length (in bytes) of the data 926; the data bytes 928 themselves; and last of all, the CRC (16 bit) number 930 (computed from the contents of the packet)

After a 10 second delay, a NAK (flag (not shown) cleared, and a NO NAK COUNTER is set to the count of 20. Then, at step 1404, the TX DONE flag is cleared, the first byte of the packet (a preamble byte) is placed into the transmit buffer 908, and the TX INTERRUPT routine 2300 is placed into operation to transfer the packet to the radio transmitter 702. The TRANSMIT PACKET routine 1400 then idles at step 1406 until the TX INTERRUPT routine sets the COMPLETE PACKET flag (step 2436 in FIG. 24) to indicate all of the data bytes have been transmitted. Following an 8 hundredths of a second delay at step 1408, program control then commences in FIG. 15 where the master unit awaits the receipt back of an ACK or NAK packet from the remote slave unit.

Figure 15:
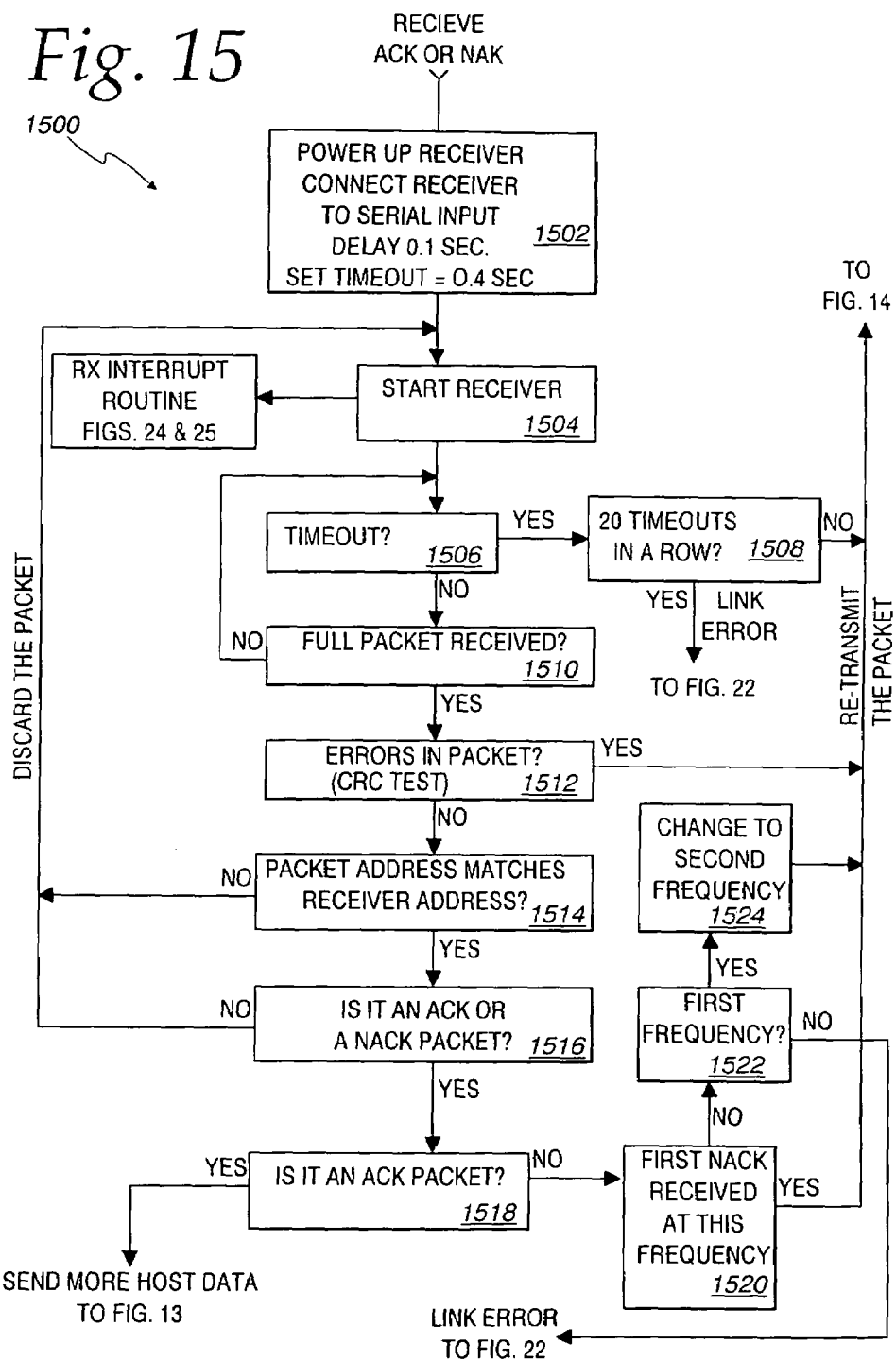
FIG. 15 is a block diagram of a RECEIVE ACK OR NAK routine 1500 which receives back from the remote slave unit data packets indicating whether or not transmitted packets of host data were properly received.

The RECEIVE ACK or NAK routine 1500 is shown in FIG. 15. When this routine is entered, data received from the host computer has been packetized and transmitted as a radio packet 912 to a remote slave unit. The master unit is now awaiting the return of an ACK data frame or a NAK data frame, confirming the successful transmission or confirming that there were errors in the transmission.

The routine commences at step 1502 with the powering up of the receiver 708. After a 1/10th second delay, the radio receiver buffer 938 is set up and cleared and a timeout for the receipt of an ACK or NAK packet is set to 4/10ths of a second. Then, at step 1504, the receiver is started by placing the RX INTERRUPT routine 2400 into operation to receive incoming data, placing any packet received in the radio receive buffer 938. Program control then fluctuates between the TIMEOUT test 1506 and the full packet received test 1510 continuously. If, at step 1506, the 4/10ths of a second timeout occurs, then program control returns to FIG. 14 where the packet is retransmitted. But if twenty packets are sent out with no response, then at step 1508 a link error is declared, and program control commences with the LINK ERROR routine 2200 in FIG. 22.

At step 1510, a test is made to see if a full packet has been received, by checking the status of the complete packet flag. If so, then step 1512 checks for any errors in the packet by performing the CRC computation and comparing the computed value with the value sent at 920 within the packet 912. If there is an error, then the packet is retransmitted. Otherwise, at step 1514, the packet address is checked in the destination field 918 to see if it matches the address of the master unit which has just received the packet. If not, then program control recommences at step 1504, and the search is continued for another incoming packet. If the address matches, then step 1516 checks to see if the incoming packet is an ACK or a NAK packet of the kind expected. If not, then once again program control returns to step 1504, and the next packet is searched for.

If the incoming packet is error free, contains the right address, and is an ACK or a NAK packet, then at step 1518, if it is an ACK packet, the data packet was successfully received and verified. Accordingly, program control commences back in FIG. 13 with a request for more data from the host computer to send over the radio link.

If a NAK packet is received, then at step 1520, the fact that this is the first NAK received is indicated by the fact that a NAK received flag is still clear. If so, then step 1520 sets this flag, and the packet is re-transmitted by the steps in FIG. 14. But if the first NAK flag is set, then two NAKs have been received, and the test at 1520 fails.

If the packet is a NAK packet, and at step 1520 if it is the second NAK packet received at this frequency, then if step 1522 determines this is the first frequency tried, step 1524 alters the transmitter to the second frequency, and the packet is retransmitted in FIG. 14. Step 1524 also resets the first NAK flag. But if two NAKs have been received at the second frequency, at step 1522, then step 1522 declares a link error, and program control commences with the LINK ERROR routine 2200 in FIG. 22.

That completes a description of the TX routine portion 1100 of the main program 1000 utilized when the unit is a master unit. When the unit has its switch 540 set to the RX position, indicating it is a slave or remote unit, the RX routine 1600 of the main program 1000 takes control of the unit. The description of the RX routine 1600 is presented in FIGS. 16 and 21.

An overview block diagram of the RX routine 1600 is presented in FIG. 16. With reference to FIG. 5, the position of the selector switch 538 is ignored in this case, and the switch 540 is in the RCV position. Following powering on of the unit, or following actuation of the reset switch 542, a RECEIVE LINK PACKET routine 1700 is placed into operation. For a period of about 30 seconds, this routine 1700 powers up the receiver 708 (FIG. 7) and awaits a broadcast link request type packet from a master unit. If a link request packet is not received within 30 seconds, a link error is declared, and program control recommences with the LINK ERROR routine 2200 in FIG. 22 until the reset switch 542 is again actuated or the power is turned on or off or the switch 540 is repositioned.

If a link request type packet arrives, then at 1800 a TEST PRINTER routine is run which checks out the status of the printer or other device to which the remote slave unit is connected. A link response plus a printer status packet is then built at step 1900 and at step 1904 it is sent back to the master unit. Having thus linked to a master unit, the unit then enters the routine 2000 where it awaits the receipt of an incoming data packet. The first packet received will usually be a second, non-broadcast link request packet, this time not a broadcast packet (with the destination address FFFF hexadecimal) but a packet definitely addressed to this particular unit. Program control then flows over the path 1602 back to the point where the printer is again tested, a link response and printer status packet is again built up and is again sent back to the master unit. And if the printer is not ready, the incoming packets will usually remain link packets until the printer is ready to print. Also, if there is no host data to be sent, fully addressed link packets will continue to flow in every two minutes.

When an accurate data packet is finally received at step 2000, the data is sent to the printer at step 2100, and at step 1902 an ACK packet is built up and sent back to the master unit to signal successful reception of the data. Program control resumes at step 2000 awaiting the next incoming packet. However, if the data is bad, then a NAK packet is built at step 1906, and at step 1904 it is sent back to the master unit. But if, for some reason the radio communications link is unable to sustain the flow of incoming data, the routine 2000 declares a link error, and program control commences with the LINK ERROR routine 2200 at FIG. 22.

Figure 17:
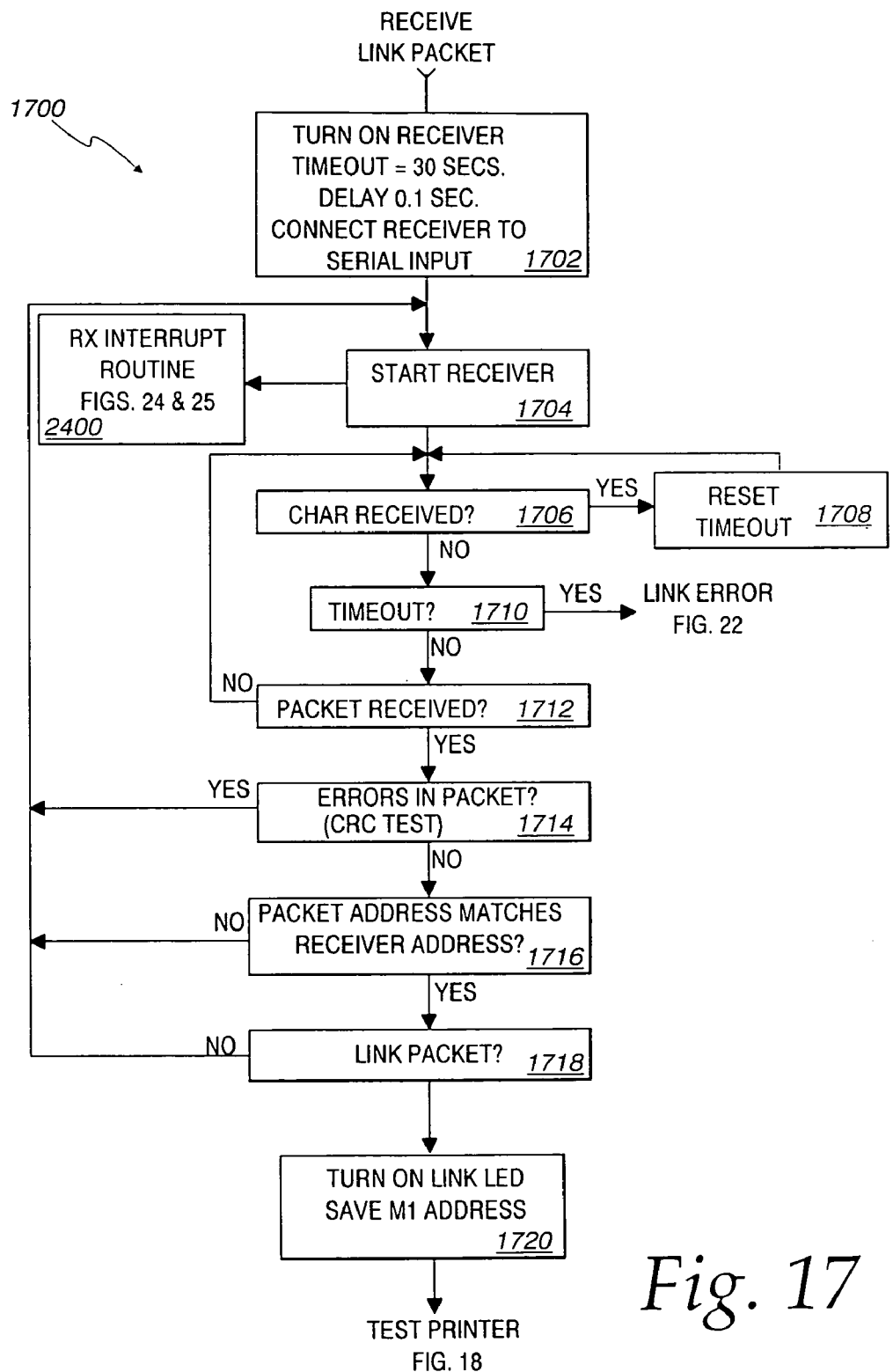
FIG. 17 is a block diagram of a RECEIVE LINK PACKET routine 1700 which enables such a slave remote serial communications radio unit to establish an address linkage with a master unit when first turned on and prior to the transmission of any data.

FIG. 17 presents a block diagram of the RECEIVE LINK PACKET routine 1700. This routine is placed into operation upon the powering up of the unit having its TX-RX switch 540 in the RX position, indicating that this is a slave unit most likely connected up to a printer. The routine commences by turning on the power for the receiver 702 (FIG. 7) and setting a timeout of thirty seconds. The multiplexer 512 (FIG. 5) is switched to the B position so that the microprocessor 600's RX and TX signal lines are connected to the transmitter 702 and receiver 708. After a ten second delay, the radio receive buffer 938 is cleared at step 1702.

Next, at step 1704, the reception of data is commenced by the launching of the RX INTERRUPT routine 2400 to receive incoming data characters and data packets. At step 1706, the receive byte flag (not shown) is checked to see if any characters have come in. This flag is set by the RX INTERRUPT routine 2400 (step 2410 in FIG. 24) whenever a byte of data is received from the radio link. If a byte has come in, then at 1708, the 30 second timeout is reset. If not, then the 30 second timeout is checked at step 1710. When no characters at all have been received for 30 seconds, step 1710 declares a link error, and program control continues with the LINK ERROR routine 2200 at FIG. 22.

Assuming that an incoming packet has been received, as signaled by a complete packet flag (step 2436 in FIG. 24) step 1712 passes program control on to step 1714 where the cyclic redundancy check number is computed from the data in the incoming packet 912 and is compared to the CRC number 930 that is part of the packet 912. If there is an error, then program control recommences at step 1704, and the scan for a valid incoming packet of data continues. If the packet is error free, then at step 1716 the test is made to see if the packet 912 destination address 918 matches the address of this receiving unit in the case of an addressed packet, or contains the value all ones or FFFF hexadecimal in the case of a broadcast link request packet broadcast to any receiver. In case of a wrong address, the packet is rejected, and program control recommences at step 1704.

If the address is that of this unit or an FFFF hexadecimal address (indicating a broadcast link request packet), then at step 1718 the type or command value 922 within the packet is checked to make sure this is a link request packet and not some other type of packet.

If either a broadcast link packet or a link request packet addressed to this particular unit is received, then at step 1720 one of the link light emitting diodes 532 is illuminated, and the incoming source address 920 within the packet 912 (see FIG. 9) is saved as the address of the remote unit within the state data 942 at step 1720. Program control then commences with the printer test, which is set forth in FIG. 18.

Figure 18:
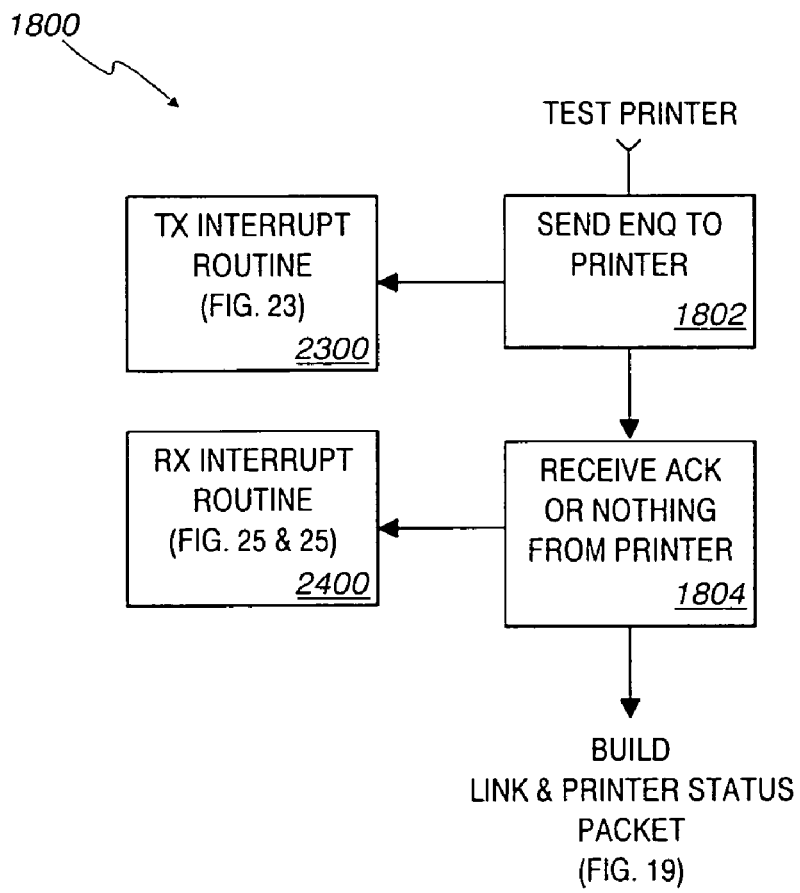
FIG. 18 is a block diagram of a TEST PRINTER routine 1800 which enables a serial communications radio unit 500 configured as a slave unit to determine the status of a printer.

FIG. 18 presents a block diagram of a TEST PRINTER routine 1800. This test begins at step 1802 by sending an ENQ character to the printer, to inquire as to its status. First, the microprocessor 600 actuates the multiplexer 512 into the A position to connect the microprocessor's TX and RX signals to the serial port driver 508 which connects to the printer. With printers of the type designed by the assignee of the present invention, a simple ASCII ENQ character is sent serially to the printer by the TX INTERRUPT routine 2300 at the request of step 1802. This produces a single character response which can be received by the RX INTERRUPT routine 2400 at the request of step 1804.

Alternatively, steps 1802 and 1804 might check out the DSR signal line 522 coming in from the printer serial port or might perform some other inquiry or test of the printer (such as a "plug and play" test procedure) to determine if it is in working order, powered up, loaded with paper, and ready to print.

Figure 19:
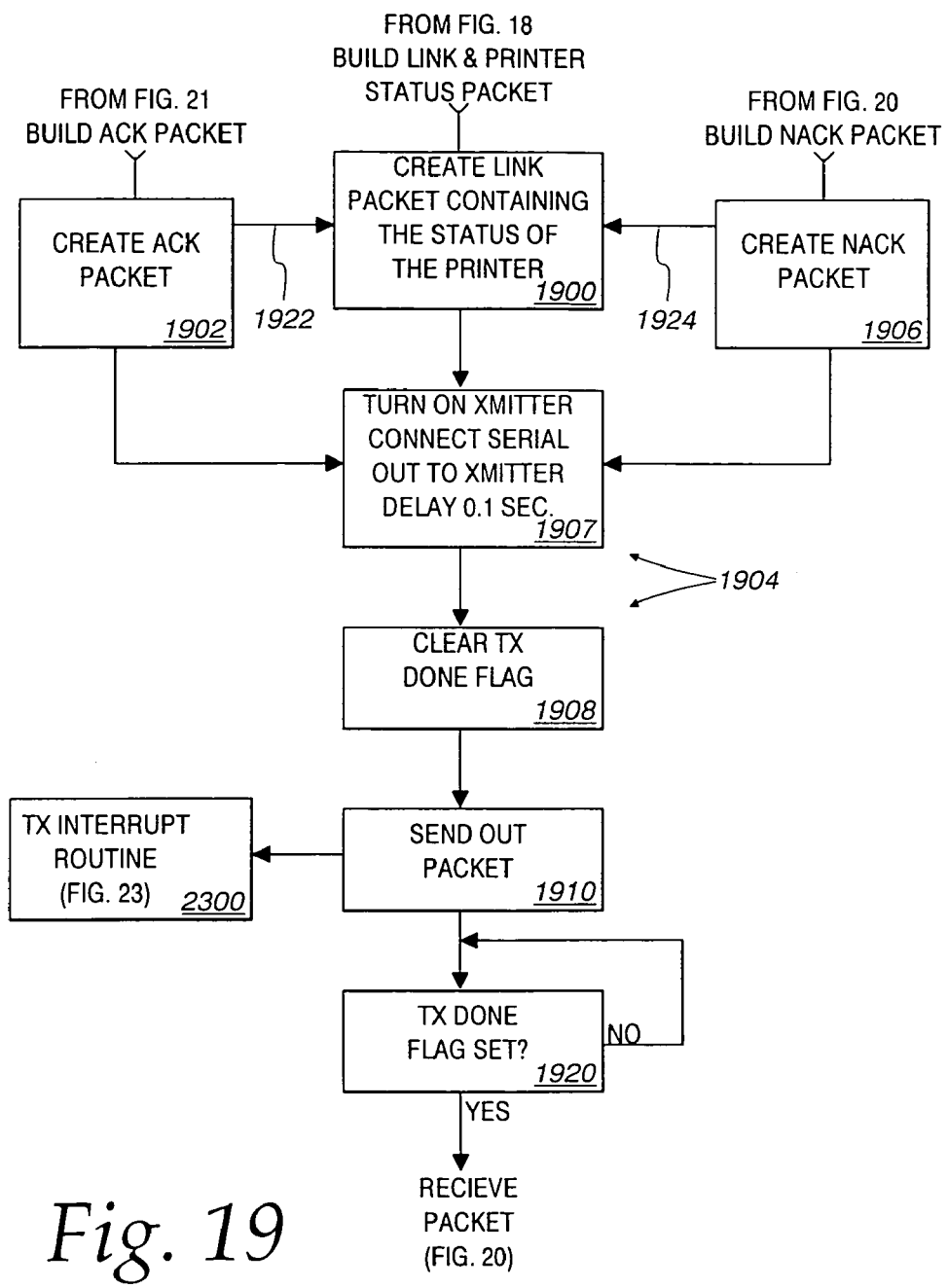
FIG. 19 is a block diagram of a routine 1900 which enables a remote slave serial communications radio unit 500 to construct a link response packet that can establish a link with a master unit and that can also return the status of the printer to the master unit.

Once the printer has been tested, or if this test is omitted, program control commences in FIG. 19 where a link reply packet containing the printer status is developed and sent back to the master unit.

FIG. 19 presents an overview of the routine 1900 which creates and sends data packets back to the master unit. This routine 1900 has three entry points depending on what type of packet is to be sent back. When the remote slave unit is first turned on, and in response to the receipt of a link request type of packet from a master unit, the entry point is a routine 1900 which assembles a link response type of packet containing optionally the printer status. This packet is assembled at 1900 and is placed into the radio transmit buffer 936 in the manner described above. Next, at step 1907, the transmitter 702 (FIG. 7) is powered on and the multiplexer 512 is switched to the B position so that the TX signal line is connected to the XMT DAT signal line 517 which leads to the transmit 702. Following a delay of ¹⁄₁₀th of a second, at step 1908, the flag TX DONE is cleared and then (at step 1910) a first byte is placed into the transmit register 908, and the TX INTERRUPT routine 2300 is placed into operation to automatically transmit the entire packet. In the meanwhile, the background program 1920 repeatedly tests the TX DONE flag until the transmission is completed and then proceeds on to FIG. 20 to receive the next incoming data packet.

The alternate entry points 1902 and 1906 in the routine shown in FIG. 19 simply create ACK packets, to acknowledge correct receipt of data, and NAK packets, to acknowledge the incorrect receipt of data. In all other respects, these entry points behave in the same matter as the entry point 1900 just described.

Note that any time when an ACK or NAK packet would normally be formed at step 1902 or 1906, if the printer becomes unavailable, it is appropriate to shift program control to the step 1900 and to send back a link response type packet with data indicating that the printer is not ready so as to cause the master unit microprocessor 600 to terminate its DTR signal 524 to stop the host from sending any more data. It is important at this point that the master unit preserve any data which it has received and not yet discarded, if possible, so as to provide the greatest possibility of continuity in the transfer of data to the printer. The transfer of program control from the CREATE ACK PACKET and CREATE NAK PACKET steps 1902 and 1906 in the case of a printer failure to the CREATE LINK PACKET step 1900 is illustrated by the arrows 1922 and 1924 in FIG. 19.

Figure 20:
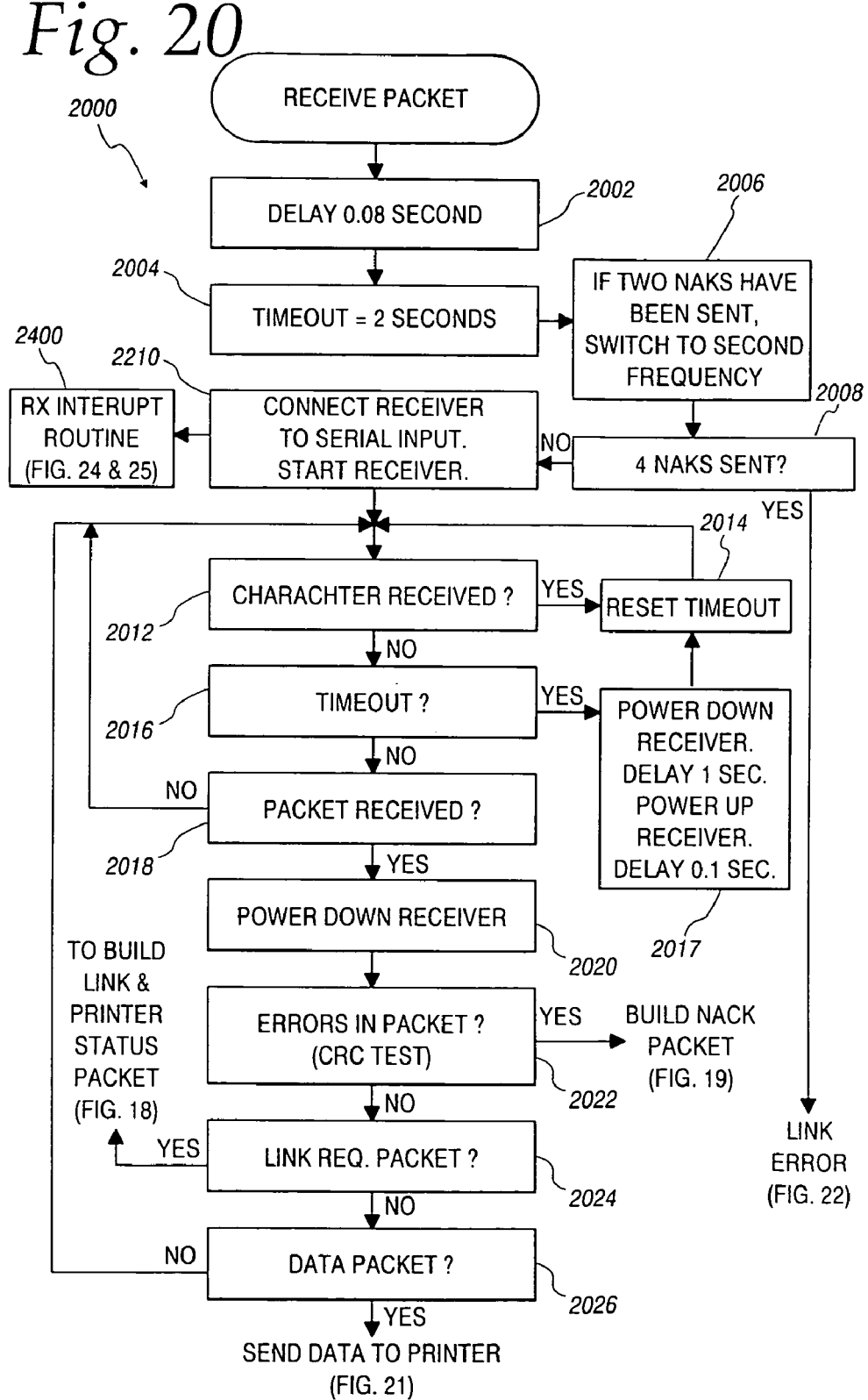
FIG. 20 is a block diagram of a RECEIVE PACKET routine 2000 which is a normal standby routine that runs in a serial communications radio unit 500 configured as a remote slave RCV unit when it is awaiting packetized data from a master unit.

FIG. 20 is a block diagram of the RECEIVE PACKET routine 2000 which is executed in a slave remote unit operating in the RX mode when the unit is waiting for data packets to come in from a master unit at the request of a host computer.

After ⁸⁄₁₀₀ths second delay at step 2002, and after setting a timeout of two seconds at step 2004, program control proceeds through the steps 2006 and 2008 (described below) to step 2010 where the multiplexer 512 is switched to the B position so that the RCV DAT signal 515 is connected to the RX input of the microprocessor 600 and so that the incoming data can enter the receive register 910 (FIG. 9). The RX INTERRUPT routine 2400 is then placed into operation to receive the incoming characters.

Program control then loops between the three steps 2012, 2016, and 2018 continuously in the background while the RX INTERRUPT routine 2400 awaits the hardware imputing of characters into the receive register 910. Each time a character is received, step 2012 causes program step 2014 to reset the timeout to two seconds again, thereby restarting the timeout.

If two seconds elapse with no characters received, then step 2016 signals a timeout and transfers program control to 2017. The RX INTERRUPT routine 2400 is then shut down, and the receiver 708 is powered down completely along with the serial port driver 508 and even the microprocessor 600 itself if that can be arranged. This power down state, which is intended to conserve battery power, is maintained for one second, after which the receiver 708 is powered up again. Following a delay of ¹⁄₁₀th of a second, the RX INTERRUPT routine 2400 is again placed into operation and then the timeout value is reset to two seconds at step 2014. Steps 2012, 2016, and 2018 then recommence awaiting incoming characters.

It can be seen that if no data packets come in after two seconds, the receiver powers down for one second and then repowers up for another two second interview awaiting incoming data characters. In this manner, power consumption of the remote unit is reduced by one/third. If, after additional time passes, there is still no flow of data characters from the master unit, the ratio of on time to off time may be furthered varied to give even greater reductions in power consumption. For example, the two second on and one second off protocol illustrated in FIG. 20 can be varied by having step 2017 select a delay longer than one second. For example, the two second on and one second off protocol may be maintained for one minute. After that, if no characters are received, a two seconds on and a five seconds off protocol may be maintained for a second one minute period. If still no characters are received, then a third pattern of two seconds on followed by ten seconds off may be entered, thus saving eighty percent of the battery power required to run the receiver continuously. And since the transmitting unit knows when it sent out the last character, and knows the algorithm of the receiving unit, the transmitting unit will know when the receiving unit is powered down and will not attempt to send characters except during those brief intervals when the receiving unit is powered up. In this manner, by having both the master unit and slave units shut down their energy consuming transmitters and receivers most of the time, as well as the serial port drivers and microprocessors, and only having them active at simultaneous moments, large savings in power consumption can be achieved at times when data is not being transmitted across the radio link.

If a data packet is sent by radio to the remote unit, eventually the RX INTERRUPT routine 2400 will set a complete packet flag which is detected in due course by the MAIN routine at step 2018. The receiver 708 is powered down in step 2020, and then at step 2022 a CRC cyclic redundancy check number is computed from the data in the packet and is compared to the CRC number 920 that accompanied the packet 912. If they do not match, then there are errors in the packet, the program control proceeds to FIG. 19 where a NAK packet is returned to the master unit, informing the master unit of the errors and requesting a retransmission of the packet.

If the packet is error free, then step 2024 checks to see if the packet is a link request packet. If so, program control recommences in FIG. 18 with the testing of the printer and then proceeds to FIG. 19 where a link response plus printer status packet is built and is then transmitted back to the master unit.

Figure 21:
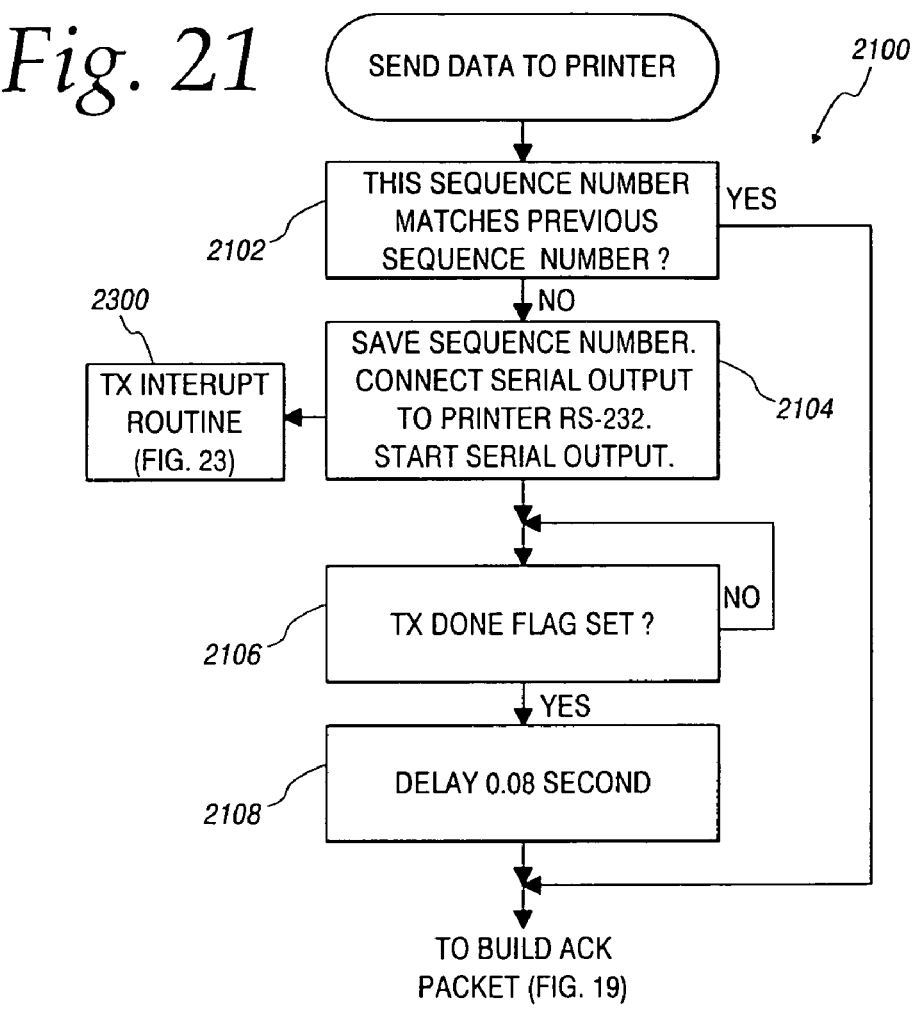
FIG. 21 is a block diagram of a SEND DATA TO PRINTER routine 2100 which sends data received by a serial communications radio unit 500 configured as a remote slave RCV unit to a connected printer or other device.

If the packet is error free and is truly a data packet, then program control commences in FIG. 21 where the data is sent on to the printer, and ultimately program control returns to FIG. 19 where an ACK packet acknowledging receipt of correct data is sent back to the master unit. But if the packet is other than a data packet, the packet is simply discarded, and program control continues with the character received test at step 212.

FIG. 21 presents a block diagram view of the SEND DATA TO PRINTER routine 2100. This routine is called upon after a remote slave unit has received by radio a packet of data that is to be sent on to the printer or other utilization device. The data is contained within the radio receive buffer 938 (FIG. 9) and is packetized as shown at 912.

At step 2102, the sequence number 924 within the packet 912 is examined to see if this is the next sequential packet that is to be received and sent to the printer. It is possible that the master unit has sent out a duplicate packet after having not received back an ACK data packet, either because the ACK packet was lost through interference, or because the routine 2100 was so slow in sending data to the printer a new copy of the same data packet to be sent out. If the sequence number has not been incremented, indicating this is a duplicate of the preceding packet, then the routine 2100 terminates prematurely, and program control moves to FIG. 19, step 1902, where an ACK packet is created and sent back to acknowledge receipt of the packet and to request the next one.

Assuming that the sequence numbering is proper, then at step 2104 the new sequence number is saved. The multiplexer 512 is actuated to port A so that the microprocessor 600's TX signal is connected by signal line 516 to the serial port driver 508 and thence to the printer or other external destination for the data. The first byte of information is then placed into the transmit register 908 (FIG. 9), and the remaining packet data 928 is transferred to the transmit queue 932. The TX INTERRUPT routine 2300 is then placed into operation to be triggered each time a character is transmitted to transfer succeeding characters from the queue 932 into the transmit buffer 908. When all the data 928 has been sent to the printer, the routine 2300 sets a TX DONE flag which is detected by the background main program at step 2106. After a delay of 8/100ths of a second at step 2108, program control proceeds to FIG. 9, step 1902 where an ACK packet is created and returned to the master unit.

If a printer problem occurs, the printer terminates the DSR signal which flows through the serial port driver 508 and appears on a DSR signal line 522 that leads into the microprocessor 600. In response, the microprocessor 600 ceases transmitting until the DSR signal goes high. This, in effect, halts the SEND DATA TO PRINTER routine 2100, and accordingly no ACK packet is sent back to the master unit until after the printer has received all the data. The master unit will try for 8 seconds, resending the packet 20 times with a timeout of 0.4 seconds, before declaring a link error (step 1508 in FIG. 15)

Figure 22:
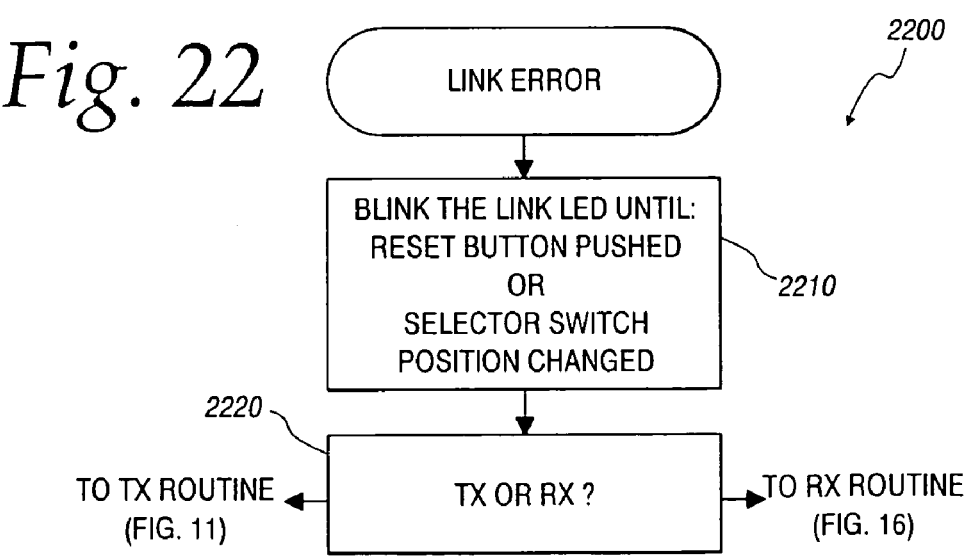
FIG. 22 is a block diagram of a LINK ERROR routine 2200 which enables a serial communications radio unit 500 to recover from an error in the linkage of a master unit to a slave unit.

FIG. 22 presents a block diagram of the link error routine which assumes program control when a unit determines that the radio linkage has been broken or cannot be formed. At step 2210, this routine causes the associated link LED 532 to flash to signal the error condition. To reset the unit so that it re-attempts to establish a linkage, the user presses the reset button 542 or alters the position of the selector switch 538. Then, at step 2220, an RX unit returns to the RX routine 1100, and a TX unit returns to the TX routine 1600.

FIG. 23 presents a block diagram of the TX INTERRUPT routine 2300. This interrupt-driven routine responds to the emptying of the transmit register 908 by placing another byte of information into the register 908 for automatic transmission by the hardware. At step 3310, if the TX DONE flag indicates that the data in the queue 932 or buffer 936 has been completely transmitted, then no action is taken, and the interrupt terminates. If the data being transmitted is directed towards a host computer or printer over an RS-232-C transmission line, this fact is detected at step 2312, and then at step 2314 a check of the incoming DSR LINE 522 is made to see if the host computer or printer has requested a halt in transmissions. If so, then at step 2332, execution of the interrupt routine is suspended temporarily, and an arrangement is established whereby one of the system timers will reactivate the routine 2300 after a brief delay interval. Accordingly, the TX INTERRUPT routine 2300 is called periodically by the timer, not by interrupts, until such time as the DSR signal 522 recommences. Then program control proceeds to step 2316.

In the case of radio packet transmissions, and in the case of serial port transmission when the DSR signal is present, at step 2316 the next byte from the radio transmit buffer 936 or the transmit queue 932 is placed into the serial port transmit register 908 to be transmitted, and then the routine 2300 terminates. But if that is the last byte in the buffer 936 or the queue 932 that needs to be transmitted (step 2318), then a flag TX DONE is set (at step 2330) to signal to the background software that the transmission has been completed.

The RX INTERRUPT routine 2400 appears in FIGS. 25 and 26 in block diagram form, with FIG. 25 presenting those portions 2402 which relate to the reception of incoming packets from radio signals that are being placed into the radio receive buffer 938, and with FIG. 25 presenting those portions 2404 relating to receiving incoming characters from a serial port and placing them into the receive queue 934.

The interrupt which places this program 2400 into operation occurs whenever a completed character is received by the serial port receive buffer 910 (FIG. 9). At step 2403, the routine checks to see if the character is coming from the host computer or printer serial port or if the character is coming from the radio linkage, in accordance with the setting of multiplexer 512 in response to the HOST/RF signal generated by the microprocessor 600.

If the data is coming from the host computer or printer in non-packetized form, the data is directed to the receiving queue 934 shown in FIG. 9, and program control commences in FIG. 25. At step 2401, a check is made to see if there is any hardware overrun or framing error indicated by the UART hardware associated with the serial port receive buffer 910. If so, the program terminates and takes no action. Otherwise, at step 2405, a receive byte flag is set to inform the background software that a character has come in and has been placed into the receive queue 934. At step 2407, the data byte is placed into the receiving queue 934, and then the interrupt routine terminates. With reference back to FIG. 13, it can seem that the receive byte flag triggers the step 1308 in the background program to check at step 1312 for receiving queue 934 overflow and, at step 1314, to disable the DTR signal sent back to the host computer to prevent the receiving queue 934 from overflowing.

In the case of packet data flowing in from the radio receiver 708 (FIG. 7), the more complicated steps shown in FIG. 24 are executed, since it is necessary to do error checking and to make a determination as to when an entire packet has been received. At step 2406, the complete packet flag is checked to see if a complete packet has already been received. If so, then the incoming character is discarded, and the interrupt routine terminates immediately, since it would be undesirable to over-write an already received packet that is residing in the radio receive buffer 938 before the complete packet flag is cleared by the background software. If not, then at step 2408 a check is made to see if there is any serial port receiver hardware error, such as an overrun or framing error. If so, then at step 2412 the radio receive buffer 938 is cleared, and the various flags discussed below are cleared, and the process of looking for a new packet is commenced anew.

If there is no hardware error, then the received byte flag is set at 2410 to allow the background software to reset its timeout counter at step 2014 in FIG. 20.

A number of software data flags now control the path taken by this state machine program as it proceeds. A first flag signals when the software is looking for the start character 916 (FIG. 9) in an incoming packet 912. A second flag indicates that the program is saving characters in the radio receive buffer 938 and that the incoming characters should be counted. When neither of these flags are set, and when the complete packet flag is also cleared, all of the flags are said to be in the reset condition, and the system state is that of looking for preamble characters (914 in FIG. 9). These preamble characters are simply synchronizing characters at the beginning of each packet which help the software define where a packet begins and to distinguish packets from background noise.

Assuming the state machine to have all the flags cleared and to be looking for preamble characters, program control commences with step 2414 and proceeds to step 2416 where tests are made to see if a valid preamble character has been received. If not, then the program halts until the next input character is ready to be examined. But if a preamble character has been found, then at step 2418, the flag to look for a start character is set, and then the program terminates. But the character is discarded and is not saved in the radio receive buffer 938.

The next time a character comes in, the set state of the look for start character flag causes step 2414 to be skipped, and then step 2420 causes program control to commence at step 2422. If a start character 916 is encountered, then at step 2426 the flag to save characters is set, and at step 2428 the counting of incoming characters is commenced. Succeeding characters will be saved in the radio receive buffer 933 and will be counted. But if the character that just came in was not a start character, a test is made at step 2424 to see if it is a second or third preamble character. If so, the program terminates with no action, and the character is discarded. But if the character is not a preamble character, the preceding preamble character is assumed to have been erroneous, and at step 2412 the radio receive buffer 938 is cleared and all the flags are cleared, and the program processes the next character from its initialized state.

Once the flag to save and count characters is set, program control proceeds past the steps 2414 and 2420 to the step 2430 where the incoming character is saved in the radio receive buffer 938. Then at 2432 the character count is incremented. At step 2434, certain of the incoming characters in the packet 912 are saved in RAM for reference by the software. The sixth byte, the type or command value, is saved; the seventh byte, which is a sequence number, is saved; the eighth byte, which is the length of the data portion of the packet 912, is also saved as a length value.

Next, in step 2436, a test is made to see if a complete packet has been received. The character count value is compared to the sum of the data packet header size (8 bytes) plus the length of the data portion 928 (represented by the value "LENGTH" in the block diagram element) plus the length of the CRCC number 920, which is two bytes. If the character count is equal to the length of the preamble plus the length of the data plus the length of the CRCC part, then all the data values have been received, and a complete packet flag is set, which disables the RX INTERRUPT routine from saving any more data bytes in the radio receive buffer 938 and, also triggers the background program to process the packet.

While the preferred embodiment of the invention has been described, it will be understood by those skilled in the art that numerous modifications and changes may be made without departing from the true spirit and scope of the invention as defined by the claims appended to and forming a part of this specification.

The invention claimed is:

1. A data processing device that can establish and maintain a wireless communication link between itself and another nearby data processing device which shares the same communications protocol, said device comprising:

a radio transceiver;

memory within said device that can contain data to be transmitted;

said device operating in a master mode and being switchable between linkage and data communications modes;

said device, when in linkage mode, sending out inquiry signals seeking communication with another device that shares the same communications protocol but in slave mode;

said device exchanging addresses with another device that shares the same communications protocol but in slave mode and that responds to one of said inquiry signals and then switches into data communications mode;

said device thereafter retrieving from said memory any data that are to be transmitted, forming the data into error-correctable, addressed data packets, sending out the packets, and thereafter awaiting acknowledgment of successful receipt of such data, to transfer the data in an error free manner from it to another device that shares the same communications protocol.

2. A data processing device in accordance with claim 1 wherein the transceiver is designed to operate on at least two differing frequencies, with automatic provision for switching of communicating devices between frequencies, to minimize interference problems.

3. A data processing device in accordance with claim 1 wherein at least some transmitted packets are addressed using data derived from the address of at least one device.

4. A data processing device in accordance with claim 1 wherein said device, once having entered the data communications mode, sends out addressed send requests when no data are available to be transmitted, or packetized data when data are available to be transmitted.

5. A data processing device in accordance with claim 4 wherein at least the transceiver portions of said device enter a low-power state at times between the generation of said send requests and packetized data.

6. A data processing device in accordance with claim 4 wherein, after sending out send requests or packetized data, said device awaits the return transmission of either an acknowledgment of data correctly received or packetized return data, which return data are placed into said memory preparatory to being utilized by said device.

7. A data processing device in accordance with claim 1 wherein said data processing device includes a bar code reader.

8. A data processing device that can establish and maintain a wireless communication link between itself and another nearby data processing device which shares the same communications protocol, said device comprising:
   a radio transceiver;
   a memory within said device that can accept received incoming data;
   said device operating in a slave mode and being switchable between linkage and data communications modes;
   said device, when in linkage mode, listening for and responding to any received inquiries from another device in linkage mode and in master mode that shares the same communications protocol, said device exchanging addresses with said another device and then said device switches into data communications mode; and
   said device thereafter, storing in said memory any data that are received in the form of error-correctable, addressed data packets that arrive, and thereafter acknowledging successful or unsuccessful receipt of such data packets, to receive the data in an error free manner from another device that shares the same communications protocol but that operates in master mode.

9. A data processing device in accordance with claim 8 wherein the transceiver is designed to operate on at least two differing frequencies, with automatic switching of communicating devices between frequencies to minimize interference problems.

10. A data processing device in accordance with claim 8 wherein at least some transmitted packets are identified by data derived from the address of at least one device.

11. A data processing device in accordance with claim 8 wherein at least the transceiver portions of said device enter a low-power state at times between the times of occurrence of said in coming data packets and periodiacally poser up to listen for incocming data packets.

12. A data processing device in accordance with claim 8 wherein said device, once having entered the data communications mode, listens for addressed send requests when no data are available to be transmitted from a master device, or for packetized data when data are available to be transmitted from a master device.

13. A data processing device in accordance with claim 11 wherein, after receiving a send request or a data packet, said device sends an acknowledgement of any data correctly received, or if its memory contains data to be sent out, an acknowledgment of data correctly received plus a packet of return data, which return data are retrieved from said memory preparatory to being transmitted.

14. A data processing device in accordance with claim 8 wherein said data processing device includes a printer.

15. A data processing device that can establish and maintain a wireless communication link between itself and another nearby data processing device which shares the same communications protocol, said device comprising:
   a radio transceiver;
   memory within said device that can contain data to be transmitted and that can accept received incoming data;
   said device operating in a master mode and being switchable between linkage and data communications modes;
   said device, when in linkage mode, sending out inquiry signals seeking communication with another device that shares the same communications protocol but in slave mode;
   said device exchanging addresses with another device that shares the same communications protocol but in slave mode and that responds to one of said inquiry signals and then switches into data communications mode;
   said device thereafter retrieving from said memory any data that are to be transmitted and transmitting said data in the form of packetized, error-correctable, addressed data packets, and thereafter awaiting acknowledgment of successful receipt of such data or awaiting acknowledgment plus a packet of return data, which return data are placed into said memory, to transfer data in an error free manner between it and another device that shares the same communications protocol but in slave mode.

16. A data processing device in accordance with claim 15 wherein the transceiver is designed to operate on at least two differing frequencies, with provision for automatic switching of communicating devices between frequencies, to minimize interference problems.

17. A data processing device in accordance with claim 15 wherein at least some transmitted packets are identified by data derived from the address of at least one device.

18. A data processing device in accordance with claim 15 wherein said device, once having entered the data communications mode, sends out addressed send requests when no data are available to be transmitted, thereafter listening for incoming data packets.

19. A data processing device in accordance with claim 18 wherein at least the transceiver portions of said device enter a low-power state at times between the generation of said send requests and when no data packets are being sent or received.

20. A data processing device in accordance with claim 15 wherein said data processing device includes a bar code reader.

21. A data processing device in accordance with claim 15 wherein said data processing device includes a printer.

22. A data processing device that can establish and maintain a wireless communication link between itself and another nearby data processing device which shares the same communications protocol, said device comprising:

a radio transceiver;

memory within said device that can contain data to be transmitted and accept received incoming data;

said device operating in a slave mode and being switchable between linkage and data communications modes;

said device, when in linkage mode, listening for and responding to any received inquiries from another device that shares the same communications protocol and that is in master mode, said device exchanging addresses with said another device and then switches into data communications mode; and said device thereafter, in response to incoming data packets or send requests, accepts and places into said memory any data in said data packets and acknowledges receipt of any such data received and, if there are any data to transmit, retrieves from said memory the data that are to be transmitted and transmitting said data, where all such data are in the form of error-correctable, addressed data packets that are sent and acknowledged when successfully received, to transfer the data in an error free manner between it and another device that shares the same communications protocol but in master mode.

23. A data processing device in accordance with claim 22 wherein the transceiver is designed to operate on at least two differing frequencies, with provision for automatic switching of communicating devices between frequencies, to minimize interference problems.

24. A data processing device in accordance with claim 22 wherein at least some transmitted packets contain addresses derived from the address of at least one device.

25. A data processing device in accordance with claim 22 wherein at least the transceiver portions of said device enter a low-power state at times between the arrival of said incoming data packets and send requests when no data are to be transmitted or received, and periodically power up to listen for incoming data packets.

26. A data processing device in accordance with claim 22 wherein said data processing device includes a bar code reader.

27. A data processing device in accordance with claim 22 wherein said data processing device includes a printer.

28. A data processing device that can establish and maintain a wireless communication between itself and another nearby data processing device which shares the same communications protocol, said device comprising:

a radio transceiver;

a memory within said device that can contain data to be transmitted;

said device operating in a slave mode and being switchable between linkage and data communications modes;

said device, when in linkage mode, listening for and responding to any received inquiries from another device that shares the same communications protocol and that is in master mode, exchanging addresses with said another device and then switching into data communications mode; and said device thereafter, in response to send requests, retrieves from said memory any data that are to be transmitted in the form of error-correctable, addressed data packets which are sent out following receipt of said send requests, and thereafter awaits acknowledgment of successful receipt of such data, to transfer the data in an error free manner between devices that share the same communications protocol.

29. A data processing device in accordance with claim 28 wherein the transceiver is designed to operate on at least two differing frequencies, with provision for automatic switching of communicating devices between frequencies to minimize interference problems.

30. A data processing device in accordance with claim 28 wherein at least some transmitted packets contain addresses derived from the address of at least one device.

31. A data processing device in accordance with claim 28 wherein said device, once having entered the data communications mode, can receive either send requests, when no incoming data have been sent, or packets of data, when incoming data are available and have been sent, and wherein said device stores said incoming data in said memory.

32. A data processing device in accordance with claim 31 wherein at least the transceiver portions of said device enter a low-power state at times between the receipt of incoming commands when no data are being transferred.

33. A data processing device in accordance with claim 28 wherein said data processing device includes a printer.

34. A data processing device that can establish and maintain a wireless communication link between itself and another nearby data processing device which shares the same communications protocol, said device comprising:

a radio transceiver;

memory within said device that can accept received incoming data;

said device operating in a master mode and being switchable between linkage and data communications modes;

said device, when in linkage mode, sending out inquiry signals seeking communication with another device that shares the same communications protocol but in slave mode;

said device exchanging addresses with another device that shares the same communications protocol and but in slave mode that responds to such inquiry signals and then switching into data communications mode;

said device thereafter sending out addressed periodic send requests and, in return, sometimes receiving back data in the form of error-correctable, addressed data packets that said device stores in said memory, said device acknowledging the successful receipt of such data, to transfer data in an error free manner from another device that shares the same communications protocol but in slave mode.

35. A data processing device in accordance with claim 34 wherein the transceiver is designed to operate on at least two differing frequencies, with provision for automatic switching of communicating devices between frequencies, to minimize interference problems.

36. A data processing device in accordance with claim 34 wherein at least some received packets contain addresses derived from the address of at least one device.

37. A data processing device in accordance with claim 34 wherein said device, once having entered the data communications mode, sends out addressed periodic send requests, when no data are available to be transmitted, or packets of data retrieved from said memory when data are available to be transmitted.

38. A data processing device in accordance with claim 34 wherein at least the transceiver portions of said device enter a low-power state at times between the generation of said periodic send requests, when no data are being transferred.

39. A data processing device in accordance with claim 34 wherein said data processing device includes a printer.

40. A data processing device that can establish and maintain a wireless communication link between itself and another nearby data processing device which shares the same communications protocol, said device comprising:
   a radio transceiver;
   memory within said device that can contain data to be transmitted and that can accept received incoming data;
   said device capable of operating in either master or slave mode, and being switchable between linkage and data communications modes;
   said device, when in linkage mode and master mode, sending out inquiry signals seeking communication with another device that shares the same communications protocol when in slave mode;
   said device, when in linkage mode and slave mode, listening for and responding to any received inquiry signals from another device that shares the same communications protocol but in master mode;
   said device, when in linkage and master mode, exchanges addresses with another device that shares the same communications protocol but in slave mode and that responds to such inquiry signals, and then switches into data communications mode;
   said device, when in linkage and slave mode, exchanges addresses with another device that shares the same communications protocol but in master mode and from which the device receives an inquiry, and then switches into data communications mode; and
   said device, when in master mode and data communications mode, sends out send requests or, when the memory contains data that are to be transmitted, retrieves from said memory such data that are to be transmitted and sends the data in the form of error-correctable, addressed data packets, and thereafter said device awaits acknowledgment of the successful receipt of any such data, or the receipt back of incoming error-correctable, addressed data packets; and
   said device, when in slave mode and data communications mode, awaiting incoming error-correctable, addressed data packets or send requests and responds by accepting any data in said memory and sending out an acknowledgment of any incoming data and, if there is data to transmit, by sending out outgoing error-correctable, addressed data packets and awaiting acknowledgment.

41. A data processing device in accordance with claim 40 wherein the transceiver is designed to operate on at least two differing frequencies, with provision for automatic switching of communicating devices between frequencies, to minimize interference problems.

42. A data processing device in accordance with claim 40 wherein at least some transmitted packets contain addresses derived from the address of at least one device.

43. A data processing device in accordance with claim 40 wherein at least the transceiver portions of said device enter a low-power state at times between the generation and receipt of said send requests at times when no data are being transmitted or received.

44. A data processing device in accordance with claim 40 wherein said data processing device includes a bar code reader.

45. A data processing device in accordance with claim 40 wherein said data processing device includes a printer.

46. A method for conducting wireless communication between a source and sink for data comprising the steps of:
   placing both said source and said sink into a first linkage mode;
   defining one of said source and sink to be the master and defining the other to be the slave;
   having the master send out inquiry signal pulses seeking a response from the slave;
   having the slave, in response to receipt of such a signal pulse, send back a responsive signal pulse;
   having the master and slave exchange addresses and thereafter both switch into a second data communications mode;
   having the master send out send requests;
   having the slave send out a signal responsive to at least some of said send requests;
   having the source send data in place of at least some of its send requests, if it is the master, or with at least some of its responsive signals, if it is the slave;
   having the sink receive data from any responsive signal containing data, if it is the master, or replacing any send requests, if it is the slave; and
   formulating any data transmitted and received into error-correctable, addressed data packets, to thereby transfer data in an error-free manner.

47. A method in accordance with claim 46 which further includes provision for transmission of at least some data back from the sink to the source following the protocols described for transmission from the source to the sink.

48. A method in accordance with claim 46 wherein at least some the data transferred is descriptive of bar code information.

49. A method in accordance with claim 46 including the step of printing at least some of the information reaching the sink.

50. A unit, configurable as a master or slave, and installable in a data processing device, for enabling that device to communicate with another device containing a compatible device configured in the opposite master or slave state, said unit comprising:
   a transceiver;
   a control placing said device first into a linkage state to seek out a compatible unit and thereafter into a data communications state to communicate with a compatible unit once one is found;
   a first mechanism within said unit when in said linkage state that sends out, if configured as a master, or that listens for and receives, if configured as a slave, inquiry signals, and that sends out, if configured as a slave, or receives, if configured as a master, an acknowledgment signal acknowledging receipt of any such inquiry signal that is successfully sent and received, and in either case, after interchanging inquiry and acknowledgment signals and exchanging addresses that places said unit into its data communications state;
   a second mechanism within said unit when in said data communications state that causes said unit, if configured as a master, to send out send requests or data to be transmitted, or if configured as a slave, to acknowledge any data received by sending back an acknowledgment accompanied by any data to be transmitted, and in either case that accepts and acknowledges any incoming data, organizing said data sent or received into addressed, error-correctable data packets, to thereby transfer data in an error-free manner between said device and another device.

51. A unit in accordance with claim 50 wherein said unit powers itself down when no data are being transferred and no send requests are being sent or acknowledgment signals are expected.

52. A unit in accordance with claim 50 wherein said transceiver can operate on at least two different frequencies and wherein said unit, in its data communications state, can change frequencies in synchronism with another unit with which it communicates to minimize interference problems.

53. An apparatus for transferring data between a source of information and a sink for information by a wireless linkage comprising:
  a first transceiver unit connecting to said source of information and having an address;
  a second transceiver unit connecting to said sink for information and having an address;
  a handshake protocol according to which the first and second transceiver units operate, which causes the transceiver units to continuously attempt to exchange addresses by one broadcasting its address and by the other responding with its own address;
  said first and second transceiver units, following the successful exchange of addresses, placing themselves into a data communications mode where each communicates exclusively with the other and where said first and second units remain in said data communications mode indefinitely; and
  said units thereafter wirelesslyy transferring data in the form of addressed data packets, and also transferring addressed acknowledgements of receipt of such data packets, to transfer data between said source and said sink.

54. A method for establishing a wireless linkage between a source and a sink for information comprising the steps of:
  placing the source and the sink into a linkage mode where each is seeking out a linkage partner;
  while both are in the linkage mode, causing the source and sink to continuously attempt to exchange addresses to link;
  having said source and sink, following a successful link by address exchange, switch into a data communications mode where each communicates by address exclusively with the other and where said source and said sink then remain in said data communications mode indefinitely; and
  while both are in the communications mode, having the source send addressed data packets to the sink, and having the sink return addressed acknowledgements of packet receipts.

55. A wireless link comprising:
  first and second transceiver units each unit having a linkage mode and a data communications mode;
  a handshake protocol within each unit placed into operation when the unit is in the linkage mode which enables one of a pair of such units to broadcast its address and which enables the other of the pair of such units to capture the broadcast address and to return its own address, the successful exchange of addresses causing the units to enter the data communication mode; and
  a data exchange protocol within each pair of units for use in the data communication mode, which causes them to send packetized, addressed, error detectable data packets via radio to the other unit, receive such addressed packetized data, check the data for errors, and acknowledge an accurate transmission by sending a return-addressed acknowledgement packet to the other unit.

56. A wireless communication link for a device to allow the device to communicate with another device having an associated address comprising:
  a transceiver having an associated address;
  a handshake protocol according to which the transceiver operates to link to another device wherein the transceiver and other device exchange their addresses to become linked to one another; and
  a data exchange protocol according to which the transceiver operates after becoming linked to the other device wherein the transceiver transmits an addressed data packet and receives an acknowledgement of receipt of the transmitted data packet or the transceiver receives an addressed data packet and transmits an acknowledgement of receipt of the received data packet.

57. A wireless communication link as recited in claim 56 wherein said transceiver is a modular unit connectable to a printer to allow the printer to communicate wirelessly with the other device.

* * * * *

UNITED STATES PATENT AND TRADEMARK OFFICE
CERTIFICATE OF CORRECTION

PATENT NO. : 7,126,935 B1
APPLICATION NO. : 09/710351
DATED : October 24, 2006
INVENTOR(S) : Brown et al.

It is certified that error appears in the above-identified patent and that said Letters Patent is hereby corrected as shown below:

In the claims,

Col. 26, claim 11, line 5, "incocming" should be -- incoming --.

Col. 31, claim 53, line 32, "wirelesslyy" should be -- wirelessly --.

Signed and Sealed this

Twenty-seventh Day of March, 2007

JON W. DUDAS
*Director of the United States Patent and Trademark Office*